United States Patent [19]  
Yokoyama et al.

[11] Patent Number: 4,737,314  
[45] Date of Patent: Apr. 12, 1988

[54] STABILIZED ALKYLENE OXIDE ADDUCT CONTAINING LACTIC ACID OR A LACTATE

[75] Inventors: Hiromi Yokoyama, Yokohama; Koji Kakehi, Tokyo; Hitoshi Ozaki, Kawasaki; Yuson Hayashi, Yokohama, all of Japan

[73] Assignee: Nippon Shokubai Kagaku Kogyo Co., Ltd., Osaka, Japan

[21] Appl. No.: 826,230

[22] Filed: Feb. 5, 1986

[30] Foreign Application Priority Data

| Feb. 8, 1985 [JP] | Japan | 60-21916 |
| Feb. 13, 1985 [JP] | Japan | 60-24287 |
| Feb. 26, 1985 [JP] | Japan | 60-35349 |
| Mar. 25, 1985 [JP] | Japan | 60-58200 |
| Apr. 23, 1985 [JP] | Japan | 60-85434 |
| Aug. 22, 1985 [JP] | Japan | 60-183091 |
| Aug. 28, 1985 [JP] | Japan | 60-187436 |

[51] Int. Cl.$^4$ .............. C09K 15/06; C11D 1/29; C11D 1/72; C11D 3/20  
[52] U.S. Cl. .............. 252/551; 252/89.1; 252/142; 252/173; 252/174.21; 252/407; 252/548; 252/DIG. 1; 252/DIG. 14; 568/580; 568/581  
[58] Field of Search .............. 252/89.1, 136, 142, 252/173, 174.21, 407, 548, 551, DIG. 14; 568/580, 581

[56] References Cited

U.S. PATENT DOCUMENTS

| 2,130,080 | 9/1938 | Evans | 568/581 |
| 2,303,932 | 12/1942 | Guild | 252/142 |
| 2,983,763 | 5/1961 | Krause | 260/613 |
| 3,030,425 | 4/1962 | Mills | 568/581 |
| 3,030,426 | 4/1962 | Moseley et al. | 260/615 |
| 3,083,166 | 3/1963 | Harding | 252/142 |
| 3,898,186 | 8/1975 | Mermelstein | 252/528 |
| 3,941,713 | 3/1976 | Dawson | 252/142 |
| 4,181,623 | 1/1980 | Dillarstone | 252/143 |
| 4,263,284 | 4/1981 | Schreuder | 424/180 |
| 4,488,989 | 12/1984 | Lamberti | 252/541 |
| 4,608,189 | 8/1986 | Koch | 252/174.22 |

FOREIGN PATENT DOCUMENTS 2073188 10/1981 United Kingdom ............... 568/580

Primary Examiner—Dennis Albrecht  
Attorney, Agent, or Firm—Omri M. Behr

[57] ABSTRACT

A stabilized alkylene oxide adduct of a hydroxyl group-containing organic compound, having at least one compound selected from the group consisting of lactic acid and lactates and added to said alkylene oxide adduct of said hydroxyl group-containing organic compound or a sulfate thereof and a liquid detergent composition having as a detergent active component thereof the stabilized alkylene oxide adduct.

36 Claims, No Drawings

STABILIZED ALKYLENE OXIDE ADDUCT CONTAINING LACTIC ACID OR A LACTATE

BACKGROUND OF THE INVENTION

1. Field of the Invention

This invention relates to stabilized alkylene oxide adducts and sulfates thereof, and to liquid detergent compositions containing the adducts or the sulfates. More particularly, this invention relates to stabilized alkylene oxide adducts of hydroxyl group-containing organic compounds and sulfates thereof emitting no odor and experiencing very little degradation of quality by aging and to liquid detergent compositions containing the adducts or the sulfates.

2. Description of Prior Art

Generally, alkylene oxide adducts of hydroxyl group-containing organic compounds such as alcohols and phenols and sulfates thereof are utilized as surface active agents in a wide variety of fields. They have found utility in the following applications, for example.

(1) Textiles:
Scouring agents for polyester, cotton and raw wool, wetting agents, dyeing auxiliaries, fiber beaching agents, finishing agents, antistatic agents, fiber oiling agents, and emulsification of dye carrier.

(2) Paper and pulp:
Wetting agents, fininshing agents, chalk-removing agents, breaching agents, deresinating agents, and sizing agents.

(3) Metals:
Degreasing detergents, destaining and rustproofing agents, mechanical working and lubricating agetns, plating agents, quenching and tempering agents, and permeating liquids for flaw detection.

(4) Agriculture and forestry:
Emulsifiers and extenders for agricultrural pesticides and various detergents.

(5) Leather:
Chromic acid tanning agents, dyes, and finishing agents.

(6) Cleaners:
Industrial detergents, liquid detergents for household use, powdery detergents for household use, residential detergents, detergents for laundry, and detergents for automobiles.

(7) Cosmetics:
Ointments, emulsifiers, and shampoos.

(8) Others:
Dustproofing agents, agents for treating leaking oil, and oil separators.

Heretofore, the alkylene oxide adducts mentioned above have been produced by causing alkylene oxides to react upon hydroxyl group-containing organic compounds such as alcohols and phenols in the presence of alkali catalysts such as sodium hydroxide, potassium hydroxide, and sodium alkoxides or acid catalysts such as boron trifluoride, boron trifluoride complexes, antimony pentacholoride, tin tetrachloride, phosphoric acid, acetic acid, sulfuric acid, and citric acid (U.S. Pat. Nos. 3,030,426 and 2,983,763).

The alkylene oxide adducts of hydroxyl group-containing organic compounds obtained by a method of this kind, however, contain not merely unaltered hydroxyl group-containing organic compounds but also catalysts, aldehydes, free acids, peroxides, and other impurities responsible for emission of odor and discoloration, though in small amounts. The alkylene oxide adducts containing these impurities are purified by neutralization with acids or alkalis, washing with aqueous alkali solutions, distillation, reduction, adsorption, or filtration. The alkali catalysts are generally neutralized with such a neutralizing agent as a mineral acid such as sulfuric acid or phosphoric acid or acetic acid. The alkylene oxide adducts obtained as obtained above contain other impurities which are responsible for emission of odor. They, therefore, have the disadvantage that they will start emitting odor after elapse of a certain time. Particularly in recent years, the general trend of consumer demands toward increasingly high grades of household detergents has been urging liberation of the raw materials for detergents from causes for odor. The effort to sulfonate the alkylene oxide adducts degraded by aging with such a sulfonating agent as sulfur trioxide or chlorosulfonic acid entails the disadvantage that the resultant sulfonation product has a seriously degraded hue. When products aimed at are obtained by using the alkylene oxide adducts prepared by the conventional technique described above, they are far short of being fully satisfactory because they possess defects as causative factors for degradation and deterioration of quality.

The alkali catalyst such as sodium hydroxide, potassium hydroxide, or a sodium alkoxide to be used in the preparation of an alkylene oxide adduct by the reaction of a hydroxyl group-containing organic compounds with an alkylene oxide is generally purified by neutralization caused by addition of such a neutralizing agent as a mineral acid like sulfuric acid or phosphoric acid or acetic acid. When this neutralization is effected by the use of a conventional neutralizing agents, the neutralizing agent has an effect of causing the produced alkylene oxide adduct to sustain defects as causative factors for emission of odor and degradation of quality by aging. The produced alkylene oxide adduct further suffers from the disadvantage that the adduct, prepared as an aqueous solution, becomes turbid.

An object of this invention, therefore, is to provide a novel stabilized alkylene oxide adduct and a sulfate thereof and a liquid detergent composition containing the adduct or the sulfate.

Another object of this invention is to provide a stabilized alkylene oxide adduct of a hydroxyl group-containing organic compounds and sulfates thereof which emit no odor and experiences very little degradation of quality by aging and a liquid detergent composition containing the adduct or the sulfate.

SUMMARY OF THE INVENTION

The objects described above are accomplished by a stabilized alkylene oxide adduct of a hydroxyl group-containing organic compounds obtained by causing an alkylene oxide adduct of a hydroxyl group-containing organic compound or an sulfate thereof to contain at least one compound selected from the group consisting of lactic acid and lactates.

These objects are also accomplished by a liquid detergent composition containing an alkylene oxide adduct of a hydroxyl group-containing organic compound or a sulfate thereof, which detergent composition is characterized by the fact that the detergent component thereof is an alkylene oxide adduct of a hydroxyl group-containing organic compound or an sulfate thereof containing therein at least one compound selected from the group consisting of lactic acid and lactates.

The lactic acid to be used in this invention may be the product of fermentation or that of synthesis. The choice between the two methods mentioned is irrelevant. This invention does not discriminate the lactic acid particularly by its purity. Any of the industrial grade, fermentation grade, and food additive grade of lactic acid can be freely selected and used.

Typical examples of the lactates used effectively in the present invention include alkali metal salts of lactic acid such as sodium lactate, potassium lactate, and lithium lactate, alkaline earth metal salts of lactic acid such as calcium lactate, magnesium lactate, and barium lactate, and aluminum lactate, zinc lactate, silver lactate, copper lactate, iron lactate, manganese lactate, and ammonium lactate. Among other lactates cited above, sodium lactate and potassium lactate prove particularly desirable.

The amount of lactic acid and/or lactate to be added for the reaction of this invention is in the range of 0.001 to 5 parts by weight, preferably in the range of 0.05 to 1 part by weight, based on 100 parts by weight of the alkylene oxide adduct of a hydroxyl group-containing organic comound. For the sake of this addition, the pH value of the aqueous solution is desired to fall in the range of 4 to 9, preferably 5 to 7.

As regards the manner of addition of lactic acid and/or lactate in this invention, the method which comprises adding lactic acid to a hydroxyl group-containing organic compound and/or an unneutralized alkoxylate of hydroxyl group-containing organic compound obtained by the reaction of a low-mole alkoxylate of hydroxyl group-containing organic compound with an alkylene oxide in the presence of an alkali catalyst or the method which comprises adding lactic acid and/or lactate to an alkoxylate of hydroxyl group-containing organic compound in which the catalyst is retained in a neutralized state or from which the catalyst has been removed by any of the known methods such as filtration. The incorporation of lactic acid and/or lactate in the reaction system is desired to be effected by adding lactic acid and/or lactate in an unmodified form or as prepared in the form of a solution to the reaction system and then thoroughly dissolved therein by stirring to be continued for a period of 5 to 60 minutes, preferably 10 to 30 minutes.

Typical examples of the hydroxyl group-containing organic compound for use in this invention include alcohols and phenols. Examples of the alkylene oxide used advantageously in this invention are alkylene oxides of 2 to 4 carbon atoms, i.e. ethylene oxide, propylene oxide, and butylene oxide. Typical alkylene oxide adducts of hydroxyl group-containing organic compounds, therefore, are aliphatic primary alcohol ethoxylates having 6 to 30 carbon atoms in the alkyl moiety and secondary alcohol ethoxylates, alkylene oxide adducts having ethylene oxide and alkylene oxides of 3 to 4 carbon atoms added to alcohols, alkylene oxide adducts of polyhydric alcohols, and alkylene oxide adducts of phenols.

Examples of saturated and/or unsaturated aliphatic primary alcohols having 6 to 30 carbon atoms to be used in the aliphatic primary alcohol ethoxylates having 6 to 30 carbon atoms in the alkyl moiety for this invention are primary alcohols obtained by hydrogenating such vegetable oils as coconut oil, parimary alcohols obtained by hydrogenation of such animal fats as beef tallow, whale oil, and wool grease, and primary alcohols obtained by hydrogenating such organic acids as stearic acid and oleic acid. Ziegler alcohols of even numbers of carbon atoms obtained through the steps of polymerization and oxidation from ethylene in the presence of a Ziegler catalyst and the commerical products of Continental Oil Company marketed under the trademark designation of "Alfonol" are other examples. Those oxo-alcohols produced by reducing with hydrogen the oxo-aldehydes resulting from the oxo reaction of α-olefins or internal olefins with carbon monoxide and hydrogen in the presence of a cobalt carbonyl type catalyst are also included. Commercially available examples are the products of Shell marketed under the registered trademark designations of "Dovanol" and "Neodol", those of Nissan Chemical marketed under the registered trademark designation of "Oxocol", and those of Mitsubishi Chemical marketed under the registered trademark designation of "Diadol". Examples of the aliphatic primary alcohol ethoxylates having 6 to 30 carbon atoms in the alkyl moiety for use in the present invention include the products obtained by the addition of ethylene oxide to the aliphatic primary alcohols of 6 to 30 carbon atoms in the presence of an alkali catalyst such as sodium hydroxide, potassium hydroxide, or a sodium alkoxide or an acid catalyst such as boron trifluoride, a boron trifluoride complex, antimony pentachloride, or tin tetrachloride. Although the number of moles of ethylene oxide to be added by the reaction is not specifically limited, it is practically in the range of 0.1 to 100 moles, preferably 1 to 50 moles.

Examples of the secondary alcohol ethoxylate to be effectively used in the present invention include various secondary alcohol ethoxylates which are obtained by sujecting n-paraffins of 8 to 20 carbon atoms to liquid-phase oxidation with molecular oxygen in the presence of a boron compound thereby producing random secondary alcohols, causing the average of 0.1 to 6 moles, preferably the average of 1 to 4 moles, of ethylene oxide to react upon the random secondary alcohols in the presence of an acid catalyst, neutralizing or removing the catalyst and subsequently thoroughly removing unaltered free alcohols by distillation, extraction, or some other method thereby producing low-mole ethoxylates containing substantially no free alcohol, and adding to the low-mole ethoxylates ethylene oxide in an amount not particularly limited but desired to fall in the range of 0.1 to 100 moles, preferably in the range of 1 to 50 moles on the average in the presence of an alkali catalyst such as sodium hydroxide, potassium hydroxide, or a sodium alkoxide. Commercially available examples of the secondary alcohol ethoxylate are secondary alcohol ethoxylates of 12 to 14 carbon atoms and secondary alcohol ethoxylates of 10 to 12 carbon atoms produced by Nippon Shokubai Kagaku Kogyo Co., Ltd. and marketed under the registered trademark designation of "Softanol" and secondary alcohol ethoxylates of 11 to 15 carbon atoms produced by Union Carbide and marketed under the registered trademark designation of "Tergitol". Already at the stage of "3-mole ethylene oxide adducts" in the whole process of production, they are substantially completely deprived of free alcohols. They are finally obtained by the further addition of ethylene oxide to high-mole ethylene oxide adducts in the presence of a basic catalyst. Typical examples of the secondary alcohol ethoxylates are as follows:

Softanol ®-30: Averagely 3-mole ethoxylates of secondary alcohols having 12 to 14 carbon atoms.

Softanol®-50: Averagely 5-mole ethoxylates of secondary alcohols having 12 to 14 carbon atoms.

Softanol®-70: Averagely 7-mole ethoxylates of secondary alcohols having 12 to 14 carbon atoms.

Softanol®-90: Averagely 9-mole ethoxylates of secondary alcohols having 12 to 14 carbon atoms.

Softanol®-120: Averagely 12-mole ethoxylates of secondary alcohols having 12 to 14 carbon atoms.

Softanol®L-70: Averagely 7-mole ethoxylates of secondary alcohols having 10 to 12 carbon atoms.

Softanol®-200: Averagely 20-mole ethoxylates of secondary alcohols having 12 to 14 carbon atoms.

The alcohols effectively usable in the present invention in the production of alkylene oxide adducts having ethylene oxide and alkylene oxides of 3 to 4 carbon atoms added to alcohols are saturated aliphatic primary alcohols, unsaturated aliphatic primary alcohols, branched aliphatic primary alcohols, and secondary alcohols having 8 to 20 carbon atoms.

Typical examples of the saturated aliphatic primary alcohols are methyl alcohol, ethyl alcohol, butyl alcohol, octyl alcohol, stearyl alcohol, and cetyl alcohol.

Typical examples of the saturated and/or unsaturated aliphatic alcohols are those cited above.

Branched aliphatic primary alcohols are represented by isostearyl alcohol.

The secondary alcohols effectively usable in the present invention are random secondary alcohols which are obtained by subjecting n-paraffins of 8 to 20 carbon atoms to liquid-phase oxidation with molecular oxygen in the presence of a boron compound.

Examples of the alkylene oxide adducts effectively usable in the present invention include the products obtained by adding ethylene oxide and alkylene oxides of 3 to 4 carbon atoms to the aforementioned alcohols in the presence of an alkali catalyst such as sodium hydroxide, potassium hydroxide, or a sodium alkoxide or an acid catalyst such as boron trifluoride, a boron trifluoride complex, antimony pentachloride, or tin tetrachloride. The number of moles of ethylene oxide and alkylene oxides of 3 to 4 carbon atoms to be added by the reaction, though not specifically defined, generally falls in the range of 0.1 to 100 moles, preferably in the range of 1 to 50 moles.

The alkylene oxide adducts of secondary alcohols to be effectively used in the present invention are various alkylene oxide adducts of secondary alcohols obtained by a procedure which comprises converting n-paraffins of 8 to 20 carbon atoms into random secondary alcohols by liquid-phase oxidation with molecular oxygen in the presence of a boron compound, causing alkylene oxide adducts having ethylene oxide and alkylene oxides of 3 to 4 carbon atoms added thereto to react in the amount of 0.1 to 6 moles, preferably 1 to 4 moles, on the average upon the random secondary alcohols in the presence of an acid catalyst, neutralizing or removing the catalyst, then thoroughly removing the unaltered free alcohols by distillation, extraction, or some other method thereby giving rise to low-mole ethoxylates containing substantially no free alcohols, and further causing alkylene oxide adducts having ethylene oxide and alkylene oxides of 3 to 4 carbon atoms added thereto to added in an amount not specifically defined but desired to fall in the range of 0.1 to 100 moles, preferably 1 to 50 moles, on the average to the aforementioned low-mole ethoxylates in the presence of an alkali catalyst such as sodium hydroxide, potassium hydroxide, or a sodium alkoxide.

Commercially available examples of the alkylene oxide adducts having ethylene oxide and alkylene oxides of 3 to 4 carbon atoms added to secondary alcohols are alkylene oxide adducts of secondary alcohols having 12 to 14 carbon atoms and alkylene oxide adducts of secondary alcohols having 10 to 12 carbon atoms produced by Nippon Shokubai Kagaku Kogyo Co., Ltd. and marketed under the registered trademark designation of "Softanol" and alkylene oxide adducts of secondary alcohols having 11 to 15 carbon atoms produced by Union Carbide and marketed under the registered trademark designation of "Tergitol". Already at the stage of "3-mole ethylene oxide adducts" in the whole process of production, they are invariably deprived substantially thoroughly of free alcohols. They are finally obtained by the futher addition of ethylene oxide and alkylene oxides of 3 to 4 carbon atoms to high-mole ethylene oxide adducts.

Typical examples of the secondary alcohol alkylene oxide adducts are as follows:

Softanol® EP-5035: Adducts of averagely 5-mole ethylene oxides and averagely 3.5-mole propylene oxides of secondary alcohols of 12 to 14 carbon atoms.

Softanol®EP-7025: Adducts of averagely 7-mole ethylene oxides and averagely 2.5-mole propylene oxides of secondary alcohols of 12 to 14 carbon atoms.

Softanol®EP-7045: Adducts of averagely 7-mole ethylene oxides and averagely 4.5-mole propylene oxides of secondary alcohols of 12 to 14 carbon atoms.

Softanol®EP-9050: Adducts of averagely 9-mole ethylene oxides and averagely 5-mole propylene oxides of secondary alcohols of 12 to 14 carbon atoms.

The alkylene oxides of 3 to 4 carbon atoms are represented by propylene oxide and butylene oxide.

The addition of ethylene oxide and alkylene oxides of 3 to 4 carbon atoms to alcohols can be effected by block polymerization of random polymerization. The choice between these two modes of polymerization is irrelevant. The sequence in which the components of the reaction are added to the reaction system is not specifically limited.

In the addition of ethylene oxide and alkylene oxides of 3 to 4 carbon atoms to alcohols, the amount of ethylene oxide is in the range of 1 to 50 moles, preferably 2 to 20 moles and that of alkylene oxides of 3 to 4 carbon atoms in the range of 1 to 50 moles, preferably 2 to 20 moles, respectively per mole of alcohol. The molar ratio of alkylene oxides of 3 to 4 carbon atoms/ethylene oxide is desired to fall in the range of (0.02 to 50)/1, preferably (0.1 to 10)/1.

Typical examples of the polyhydric alcohols to be effectively used in the present invention include monoethylene glycol, monopropylene glyciol, 1,4-butanediol, 1,3-butanediol, 1,5-pentanediol, 2,4-pentanediol, pentaerythritol, 1,6-hexanediol, 2,5-hexanediol, 2-methyl-1,3-pentanediol, 2-methyl-2,4-pentanediol, 2,4-heptanediol, 2-ethyl-1,3-hexanediol, 2,2-dimethyl-1,3-propanediol, 2,2,4-trimethyl-1,3-pentanediol, 1,4-cyclohexanediol, 1,4-cyclohexanedimethanol, 1,2-bis(hydroxymethyl)-cyclohexane, 1,2-bis(-hydroxyethyl)-cyclohexane, trimethylol propane, 2,2-dimethyl-3-hydroxypropyl-2,2-dimethyl-3-hydroxypropionate, diethylene glycol, triethylene glycol, tetraethylene glycol, polyethylene glycol, dipropylene glycol, polypropylene glycol, bisphenol A, hydrogenated bisphenol A, trimethylolethane, glycerol, sorbitol, sucrose, and condensation product of ethylene oxide with a hydrophobic substrate formed by the condensation of propylene oxide with propylene glycol represented by the commercial products of Wyandotte Chemical marketed under trademark designation of "Pluronic" and those of Ashai Denka Kogyo K.K. marketed under trademark designation of "Pluraonic L62," and condensation products of ethylene oxide with the product of the reaction of propylene glycol with ethylene diamine represented by the commercial products of Wyandotte Chemical marketed under the trademark designation of "Tetronic" and those of Ashai Denka Kogyo K.K. markted under trademark designation of "ADEKA-TOL SO-50".

Examples of the polyhydric alcohol alkylene oxide adduct include those obtained by adding alkylene oxides to polyhydric alcohols in the presence of an alkali catalyst such as sodium hydroxide, potassium hydroxide, or a sodium alkoxide or an acid catalyst such as boron trifluoride, a boron trifluoride complex, antimony pentachloride, or tin tetrachloride. The number of moles of alylene oxide to be added by the reaction is not specifically limited but may be freely selected. Typical examples of the alkylene oxide usable effectively herein are alkylene oxides of 2 to 4 carbon atoms, e.g., ethylene oxide, propylene oxide, and butylene oxide. The addition of an alkylene oxide such as, for example, ethylene oxide, propylene oxide, or butylene oxide to a polyhydric alcohol can be effected by block polymerization or random polymerization. The sequence in which the components of the reaction are added to the reaction system is not specifically limited.

Typical examples of the phenol effectively usable herein include phenol, bisphenol, ortho-cresol, meta-cresol, para-resol, 2,4-dialkylphenols, 2,5-dialkyl-phenols, 2,6-dialkylphenols, nonylphenol, octylphenol, orthochlorophenol, metachlorophenol, para-chlorophenol, para-methoxyphenol, paraaminophenol, orthophenylphenol, t-butyl-para-cresol, hydroquinone, catechol, resorcinol, pyrogallol, 1-naphthol, 2-naphthol, 4-chloro-2-nitrophenol, para-t-butylphenol, ortho-aminophenol, dodecylphenol, octylcresol, dioctylcresol, dinonylphenol, and 2,5-dichlorophenol.

Examples of the phenol alkylene oxide adduct include those obtained by adding alkylene oxides to phenols in the presence of an alkali catalyst such as sodium hydroxide, potassium hydroxide, or a sodium alkoxide or an acid catalyst such as boron trifluoride, a boron trifluoride complex, antimony pentachloride, or tin tetrachloride. The number of moles of alkylene oxide to be added by the reaction is not specifically limited. Practically, this number is selected generally in the range of 0.1 to 100 moles, preferably 1 to 50 moles, on the average.

Typical examples of the alkylene oxide effectively usable herein are alkylene oxides of 2 to 4 carbon atoms, e.g. ethylene oxide, propylene oxide, and butylene oxide.

The addition of an alkylene oxide such as, for example, ethylene oxide, propylene oxide, or butylene oxide to a phenol is effected by block polymerization or random polymerization. The sequence in which the components of the reaction are added to the reaction system is not specifically fixed.

It has been found that the addition of lactic acid and/or a lactate to the alkylene oxide adduct of hydroxyl group-containing organic compound has an effect of notably decreasing the degradation of the adduct in terms of peroxide value, carbonyl value, pH, and odor by aging.

Typical example of the sulfate is a sulfate of the alkylene oxide adduct of the primary alcohol, a sulfate of the alkylene oxide adduct of the secondary alcohol, a sulfate of the alkylene oxide adduct having ethylene oxide and alkylene oxides of 3 to 4 carbon atoms added to alcohols, a sulfate of an alkylene oxide adducts of polyhydric alcohols, and a sulfate of the alkylene oxide adduct of the phenol.

Sulfation of the alkylene oxide adduct of the hydroxyl group containing organic compound is carried out by using a sulfating agent such as sulfur trioxide, chlorosulfonic acid, sulfonic acid and fuming sulfuric acid.

Although amount of the sulfating agent in the process is not limited, the sulfating agent is generally used in an amount of 0.5 to 2.0 moles, preferably 0.8 to 1.5 moles per mole of the alkylene oxide adduct of the hydroxyl group containing organic compound.

The reaction temperature is not more than 50° C., preferably not more than 40° C. for sulfation of the primary alcohol ethoxylate and phenol ethoxylate, and not more than 40° C., preferably not more than 20° C. for sulfation of the secondary alcohol ethoxylate.

It has been found that when the liquid detergent composition containing as a detergent active component thereof the alkylene oxide adduct of a hydroxyl group-containing organic compound incorporate therein a proper combination of various additives such as, for example, activating agent, hydrotropic agent, foaming agent, foam-stabilizing agent, foam-controlling agent, tackifier, viscosity depressant, builder, repollution inhibitor, bleacher, perfume, fluorescent whitening agent, and dye whitening agent besides aforementioned alkylene oxide adduct of hydroxyl group-containing organic compound incorporating therein lactic acid and/or a lactate, it is enabled to acquire highly desirable performance. This knowledge has also contributed to perfection of the present invention.

In the liquid detergent composition containing as the detergent active component thereof the alkylene oxide adduct of hydroxyl group-containing organic compound according to this invention, the proportion in which the alkylene oxide adduct of hydroxyl group-containing organic compound incorporating therein lactic acid and/or a lactate is contained in the detergent composition is desired to fall in the range of 0.1 to 90% by weight. The liquid detergent composition of this invention, depending on the nature of its intended use, may effectively enhance its characteristic function such as accelerated foaming, form inhibitor, synergized detergence, improved finishing, or repressed skin chapping by additionally incorporating therein 0 to 30% by weight of at least one member or a mixture of two or more members selected from the group consisting of alkylbenzene sulfonates, alkylether carbonates, fatty acid soaps, α-olefin sulfonates, sulfuric ester salts of higher alcohols, alkylether sulfates, sulfuric ester salts of fatty acid alkylol amides, alkylether phosphoric ester salts, alkylphosphoric ester salts, N-acylmethyl taurine, N-acylamino acid salts, acylated peptides, alkylalkanol amides, aliphatic amine salts, aliphatic quaternary ammonium salts, benzalkonium salts, imidazolinium salts, carboxylbetaines, amino carboxylates, imidazolinium betaines, alkylamine oxides, polyoxyethylene alkylamines, and fatty acid alkanolamies.

As a solubilizing agent (hydrotropic agent) which is held to be indispensable to a liquid detergent and to be uneconomical, one member or a mixture of two or more members selected from the group consisting of lower alcohols, ethylene glycols, propylene glycols, glycerol, cellosolves, ethanolamines, toluenesulfonic salts, xylenesulfonic salts, and urea may be used in a proportion in the range of 0 to 10% by weight.

As a visocisty modifier, one member or a mixture of two or more members selected from the group consisting of such inorganic salts as sodium chloride, potassium chloride, magnesium chloride, sodium sulfate, sodium carbonate, and potassium pyrophosphate may be used in the range of 0 to 5% by weight. The balance of the liquid detergent composition is water, which is desired to be deionized water or distilled water. For prevention from putrefaction, the liquid detergent composition may incorporate therein a suitable antiseptic or bactericide. Such additives as builder, repollution inhibitor, bleaching agent, fluorescent agent, coloring agent, perfume, and antioxidant are also available for addition to the liquid detergent composition.

It has been demonstrated that when the alkylene oxide adduct of hydroxyl group-containing organic compound incorporating therein lactic acid and/or a lactate is used as a foundation for a liquid detergent, the produced liquid detergent enjoys high quality and experiences very little aggravation of odor by aging.

Now, the embodiment of this invention will be described specifically below with reference to working examples. It should be noted, however, that this invention is not limited by these working examples. The tests involved in these working examples were performed by the following procedures.

TEST FOR EFFECT OF AGING

A 250-g sample placed in a 500-ml transparent glass vial was set in a hot air circulation type constant temperature bath at 50° C. and left undergoing a test for the effect of aging.
(1)
Carbonyl value—$\mu$ . mol/g
Carbonyl value*—mg KOH/g
(2) Acid value—mg KOH/g
(3) pH—Aqueous 5% (by weight) solution
(4) Coloration by sulfuric acid (APHA)—In a 100-ml beaker, a 1-ml sample was stirred with a Teflon-shield rotor and then the sample and 40 ml of concentrated sulfuric acid of guaranteed reagent grade quickly added thereto were stirred for 5 seconds. The resultant mixture was immediately transferred into a color comparison tube and compared with Hazen standard solutions.
(5) Odor—A 0.5-ml sample placed in 50 ml of water was kept at 50° C. and the vapor emanated from the warmed solution was smelled. The odor was rated by the following three-point scale.
A—Substantially no odor
B—Slight odor
C—Strong odor
(6) Appearance—After preparing 90 wt% of aqueous solution of samples, 250 g of the samples are added into a 500-ml transparent glass vial and the glass vial was set in a hot air circulation type constant tmeprature bath at 40° C. and subjected to turbidity test.
o: No turbidity
x: Turbidity
(7) Peroxide value—m.equivalent/kg

EXAMPLE 1

In a stainless steel reactor having an inner volume of 1,000 ml, 356 g of primary alcohol of 12 to 13 carbon atoms having an average molecular weight of 194 (produced by Nissan Chemicals Industries, Ltd. and marketed under the registered trademark designation of "Oxocol"), 0.6 g of sodium bydroxide as a catalyst, and 224 g of ethylene oxide were heated at 150° C. under pressure of 6.0 kg/cm²G for reaction. The averagely 3.0-mole ethylene oxide adduct of primary alcohol consequently obtained and 2.8 g of an aqueous 50 wt% lactic acid solution added thereto were thoroughly stirred. The primary alcohol ethoxylate produced as the result was tested for the effect of aging. The results are shown in Table 1.

CONTROL 1

An averagely 3.0-mole ethylene oxide adduct of primary alcohol prepared by following the procedure of Example 1 and 0.9 g of acetic acid added thereto were throughly stirred instead of lactic acid. The primary alcohol ethoxylate obtained as the result was tested for the effect of aging. The results are shown in Table 1.

TABLE 1

| Example | Item of test | Change by aging (number of days passed) | | | |
|---|---|---|---|---|---|
| | | 0 | 7 | 14 | 35 |
| Example 1 | Carbonyl value | 0.2 | 0.2 | 0.2 | 0.3 |
| | Acid value | 0.02 | 0.02 | 0.02 | 0.04 |
| | pH | 6.2 | 6.2 | 6.2 | 6.1 |
| | Coloration by sulfuric acid | 50 | 50 | 50 | 60 |
| | Odor | A | A | A | A |
| Control 1 | Carbonyl value | 0.2 | 0.6 | 1.4 | 2.5 |
| | Acid value | 0.02 | 0.04 | 0.03 | 0.20 |
| | pH | 6.2 | 6.1 | 5.9 | 5.5 |
| | Coloration by sulfuric acid | 50 | 80 | 110 | 200 |
| | Odor | A | A | B | C |

EXAMPLE 2

In a stainless steel reactor having an inner volume of 1,000 ml, 362 g of primary alcohol of 11 to 15 carbon atoms having an average molecular weight of 202 (produced by Mitsubishi Chemical and marketed under the registered trademark designation of "Diadol"), 0.6 g of sodium hydroxide as a catalyst, and 238 g of ethylene oxide were heated at 150° C. under 6.0 kg/cm²G for reaction. The averagely 3.0-mole ethylene oxide adduct of primary alcohol and 2.8 g of an aqueous 50 wt% lactic acid solution added thereto were thoroughly stirred. The primary alcohol ethoxylate obtained as the result was tested for the effect of aging. The results are shown in Table 2.

CONTROL 2

An averagely 3.0-mole ethylene oxide adduct of primary alcohol obtained by following the procedure of Example 2 and 0.9 g of an aqueous 85% wt% phosphoric acid solution added thereto were thoroughly stirred instead of lactic acid. The primary alcohol ethoxylate obtained as the result was tested for the effect of aging. The results are shown in Table 2.

TABLE 2

| Example | Item of test | Change by aging (number of days passed) | | | |
|---|---|---|---|---|---|
| | | 0 | 7 | 14 | 35 |
| Example 2 | Carbonyl value | 0.1 | 0.2 | 0.2 | 0.4 |
| | Acid value | 0.01 | 0.01 | 0.01 | 0.04 |
| | pH | 6.4 | 6.4 | 6.3 | 6.1 |
| | Coloration by sulfuric acid | 50 | 50 | 50 | 60 |
| | Odor | A | A | A | A |
| Control 2 | Carbonyl value | 0.2 | 0.5 | 1.4 | 2.8 |
| | Acid value | 0.01 | 0.04 | 0.09 | 0.19 |
| | pH | 6.4 | 6.0 | 5.8 | 5.5 |
| | Coloration by sulfuric acid | 50 | 70 | 120 | 230 |
| | Odor | A | A | B | C |

EXAMPLE 3

In a stainless steel reactor having an inner volume of 1,000 ml, 356 g of primary alcohol of 12 to 13 carbon atoms having an average molecular weight of 194 produced by Shell Company and marketed under the registered trademark desingation of "Dobanol"), 0.6 g sodium hydroxide as catalyst, and 244 g of ethylene oxide were heated at 150° C. under pressure of 6.0 kg/cm$^2$G for reaction. The averagely 3.0-mole ethylene oxide adduct of primary alcohol obtained as the result and 2.8 g of an aqueous 50 wt% lactic acid solution added thereto were thoroughly stirred. The primary alcohol ethoxylate obtained as the result was tested for the effect of aging. The results are shown in Table 3.

CONTROL 3

An averagely 3.0-mole ethylene oxide adduct of primary alcohol obtained by following the procedure of Example 3 and 1.5 g of an aqueous 50 wt% sulfuric acid solution added thereto were thoroughly stirred instead of lactic acid. The primary alcohol ethoxylate obtained as the result was tested for the effect of aging. The results are shown in Table 3.

TABLE 3

| Example | Item of test | Change by aging (number of days passed) | | | |
|---|---|---|---|---|---|
| | | 0 | 7 | 14 | 35 |
| Example 3 | Carbonyl value | 0.1 | 0.1 | 0.1 | 0.3 |
| | Acid value | 0.01 | 0.01 | 0.02 | 0.04 |
| | pH | 6.3 | 6.3 | 6.3 | 6.1 |
| | Coloration by sulfuric acid | 40 | 50 | 50 | 60 |
| | Odor | A | A | A | A |
| Control 3 | Carbonyl value | 0.1 | 0.5 | 1.5 | 2.8 |
| | Acid value | 0.01 | 0.06 | 0.09 | 0.21 |
| | pH | 6.4 | 6.0 | 5.9 | 5.5 |
| | Coloration by sulfuric acid | 50 | 80 | 120 | 220 |
| | Odor | A | A | B | C |

EXAMPLE 4

In a stainless steel reactor having an inner volume of 1,000 ml, 356 g of primary alcohol of 12 to 13 carbon atoms having an average molecular weight of 194 (produced by Nissan Chemical Industries, Ltd. and marketed under the registered trademark designation of "Oxocol"), 1.0 g of potassium hydroxide as a catalyst, and 244 g of ethylene oxide were heated at 150° C. under pressure of 6.0 kg/cm$^2$G for reaction. The averagely 3.0-mole ethylene oxide adduct of primary alcohol obtained as the result and 3.1 g of an aqueous 50 wt% lactic acid solution added thereto were thoroughly stirred. The primary alcohol ethoxylate obtained as the result was tested for the effect of aging. The results are shown in Table 4.

CONTORL 4

An averagely 3.0-mole ethylene oxide adduct of primary alcohol obtained by following the procedure of Example 4 and 1.1 g of acetic acid added thereto were thoroughly stirred instead of lactic acid. The primary alcohol ethoxylate obtained as the result was tested for the effect of aging. The results are shown in Table 4.

TABLE 4

| Example | Item of test | Change by aging (number of days passed) | | | |
|---|---|---|---|---|---|
| | | 0 | 7 | 14 | 35 |
| Example 4 | Carbonyl value | 0.1 | 0.2 | 0.2 | 0.3 |
| | Acid value | 0.02 | 0.02 | 0.02 | 0.03 |
| | pH | 6.3 | 6.3 | 6.3 | 6.1 |
| | Coloration by sulfuric acid | 40 | 50 | 50 | 60 |
| | Odor | A | A | A | A |
| Control 4 | Carbonyl value | 0.2 | 0.6 | 1.5 | 2.5 |
| | Acid value | 0.02 | 0.04 | 0.09 | 0.21 |
| | pH | 6.3 | 6.0 | 5.8 | 5.5 |
| | Coloration by sulfuric acid | 50 | 70 | 110 | 200 |
| | Odor | A | A | B | C |

EXAMPLE 5

In a stainless steel reactor having an inner volume of 1,000 ml, 196 g of primary alcohol of 12 to 13 carbon atoms having an average molecular weight of 194 (produced by Nissan Chemical Industries, Ltd. and marketed under the registered trademark designation of "Oxocol"), 0.6 g of sodium hydroxide as a catalyst, and 404 g of ethylene oxide were heated at 150° C. under pressure of 6.0 kg/cm$^2$G for reaction. The averagely 9.0-mole ethylene oxide adduct of primary alcohol obtained as the result and 2.8 g of an aqueous 50 wt% lactic acid solution added thereto were thoroughly stirred. The primary alcohol ethoxylate obtained as the result was tested for the effect of aging. The results are shown in Table 5.

CONTROL 5

An averagely 9.0-mole ethylene oxide adduct of primary alcohol obtained by following the procedure of Example 5 and 0.9 g of acetic acid added thereto were thoroughly stirred instead of lactic acid. The primary alcohol ethoxylate obtained as the result was tested for the effect of aging. The results are shown in Table 5.

TABLE 5

| Example | Item of test | Change by aging (number of days passed) | | | |
|---|---|---|---|---|---|
| | | 0 | 7 | 14 | 35 |
| Example 5 | Carbonyl value | 0.1 | 0.2 | 0.2 | 0.3 |
| | Acid value | 0.01 | 0.01 | 0.03 | 0.05 |
| | pH | 6.3 | 6.3 | 6.3 | 6.1 |
| | Coloration by sulfuric acid | 50 | 50 | 50 | 60 |
| | Odor | A | A | A | A |
| Control 5 | Carbonyl value | 0.1 | 0.4 | 1.5 | 2.9 |
| | Acid value | 0.02 | 0.05 | 0.12 | 0.23 |
| | pH | 6.2 | 6.0 | 5.8 | 5.4 |
| | Coloration by sulfuric acid | 50 | 80 | 120 | 250 |
| | Odor | A | A | B | C |

EXAMPLE 6

In a stainless steel reactor having an inner volume of 1,000 ml, 198 g of primary alcohol of 12 to 16 carbon atoms having an average molecular weight of 197, 0.6 g of sodium hydroxide as a catalyst, and 402 g of ethylene oxide were heated at 150° C. under pressure of 6.0 kg/cm²G for reaction. The averagely 9.0-mole ethylene oxide adduct of primary coconut oil alcohol obtained as the result and 2.8 g of an aqueous 50 wt% lactic acid solution added thereto were thoroughly stirred. The primary alcohol ethoxylate obtained as the result was tested for the effect of aging. The results are shown in Table 6.

CONTROL 6

An averagely 9.0-mole ethylene oxide adduct of primary coconut oil alcohol obtained by following the procedure of Example 6 and 0.9 g of acetic acid added thereto were thoroughly stirred instead of lactic acid. The primary alcohol ethoxylate obtained as the result was tested for the effect of aging. The results are shown in Table 6.

TABLE 6

| Example | Item of test | Change by aging (number of days passed) | | | |
|---|---|---|---|---|---|
| | | 0 | 7 | 14 | 35 |
| Example 6 | Carbonyl value | 0.2 | 0.2 | 0.2 | 0.4 |
| | Acid value | 0.01 | 0.01 | 0.02 | 0.03 |
| | pH | 6.4 | 6.4 | 6.3 | 6.2 |
| | Coloration by sulfuric acid | 50 | 50 | 50 | 70 |
| | Odor | A | A | A | A |
| Control 6 | Carbonyl value | 0.2 | 0.4 | 1.4 | 2.6 |
| | Acid value | 0.01 | 0.04 | 0.10 | 0.22 |
| | pH | 6.5 | 6.2 | 5.9 | 5.4 |
| | Coloration by sulfuric acid | 50 | 80 | 110 | 240 |
| | Odor | A | B | B | C |

EXAMPLE 7

In a stainless steel reactor having an inner volume of 1,000 ml, 356 g of primary alcohol of 12 to 13 carbon atoms having an average molecular weight of 194 (produced by Nissan Chemical Industries, Ltd. and marketed under the registered trademark designation of "Oxocol"), 0.6 g of sodium hydroxide as a catalyst, and 244 g of ethylene oxide were heated at 150° C. under pressure of 6.0 kg/cm²G for reaction. The averagely 3.0-mole ethylene oxide adduct of primary alcohol obtained as the result and 12 g of Kyowado 600 BUPS added thereto were stirred at 80° C. for 30 minutes. The resultant mixture was transferred into a filter precoated with diatomaceous earth and treated therein for removal of Kyowado 600 BUPS which had adsorbed the catalyst. The averagely 3-mole ethylene oxide adduct separated by the filtration and 3.5 g of an aqueous 50 wt% sodium lactate solution added thereto were thoroughly stirred. The primary alcohol ethoxylate obtained as the result was tested for the effect of aging. The results are shown in Table 7.

CONTROL 7

A primary alcohol ethoxylate was obtained by following the procedure of Example 7, except that the addition of sodium lactate was omitted. It was tested for the effect of aging. The results are shown in Table 7.

TABLE 7

| Example | Item of test | Change by aging (number of days passed) | | | |
|---|---|---|---|---|---|
| | | 0 | 7 | 14 | 35 |
| Example 7 | Carbonyl value | 0.2 | 0.2 | 0.3 | 0.4 |
| | Acid value | 0.01 | 0.01 | 0.01 | 0.02 |
| | pH | 6.6 | 6.6 | 6.5 | 6.3 |
| | Coloration by sulfuric acid | 50 | 50 | 60 | 60 |
| | Odor | A | A | A | A |
| Control 7 | Carbonyl value | 0.2 | 0.4 | 0.8 | 2.0 |
| | Acid value | 0.01 | 0.02 | 0.05 | 0.11 |
| | pH | 6.4 | 6.2 | 6.1 | 5.8 |
| | Coloration by sulfuric acid | 50 | 70 | 90 | 150 |
| | Odor | A | B | B | C |

EXAMPLE 8

In a stainless steel reactor having an inner volume of 1,000 ml, 393 g of an averagely 3-mole ethoxylate of secondary alcohol of 12 to 14 carbon atoms having an average molecular weight of 333 (produced by Nippon Shokubai Kagaku Kogyo Co., Ltd. and marketed under the registered trademark designation of "Softanol-30"), 0.6 g of sodium hydroxide as a catalyst, and 207 g of ethylene oxide were heated at 150° C. under pressure of 6.0 kg/cm²G for reaction. The averagely 7-mole ethylene oxide adduct of secondary alcohol obtained as the result and 2.8 g of an aqueous 50 wt% lactic acid solution added thereto were thoroughly stirred. The secondary alcohol ethoxylate obtained as the result was tested for the effect of aging. The results are shown in Table 8.

CONTROL 8

An averagely 7-mole ethylene oxide adduct of secondary alcohol obtained by following the procedure of Example 8 and 0.9 g of acetic acid added thereto were thoroughly stirred instead of lactic acid. The secondary alcohol ethoxylate obtained as the result was tested for the effect of aging. The results are shown in Table 8.

TABLE 8

| Example | Item of test | Change by aging (number of days passed) | | |
|---|---|---|---|---|
| | | 0 | 7 | 14 |
| Example 8 | Peroxide value | 0.1 | 0.3 | 0.6 |
| | Carbonyl value* | 0.2 | 0.2 | 0.2 |
| | Acid value | 0.01 | 0.01 | 0.02 |
| | pH | 6.1 | 6.1 | 6.1 |
| | Odor | A | A | A |
| Control 8 | Peroxide value | 0.1 | 0.6 | 1.0 |
| | Carbonyl value* | 0.2 | 0.5 | 0.9 |
| | Acid value | 0.01 | 0.07 | 0.1 |
| | pH | 6.3 | 5.8 | 5.5 |
| | Odor | A | A | B |

EXAMPLE 9

In a stainless steel reactor having an inner volume of 1,000 ml, 334.5 g of an averagely 3-mole ethoxylate of secondary alcohol of 12 to 14 carbon atoms having an average molecular weight of 333 (produced by Nippon Shokubai Kagaku Kogyo Co., Ltd. and marketed under the registered trademark designation of "Softanol-30"), 0.6 g of sodium hydroxide as a catalyst, and 265.5 g of ethylene oxide were heated at 150° C. under pressure of 6.0 kg/cm²G for reaction. The averagely 9-mole ethylene oxide adduct of secondary alcohol obtained as the result and 2.8 g of an aqueous 50 wt% lactic acid solution addd thereto were thoroughly stirred. The secondary alcohol ethoxylate obtained as the result was tested for the effect of aging. The results are shown in Table 9.

CONTROL 9

An averagely 9-mole ethylene oxide adduct of secondary alcohol obtained by following the procedure of Example 9 and 0.9 g of an aqueous 85 wt% phosphoric acid solution added thereto were thoroughly stirred instead of lactic acid. The secondary alcohol ethoxylate obtained as the result was tested for the effect of aging. The results are shown in Table 9.

TABLE 9

| Example | Item of test | Change by aging (number of days passed) | | |
|---|---|---|---|---|
| | | 0 | 7 | 14 |
| Example 9 | Peroxide value | 0.1 | 0.5 | 0.8 |
| | Carbonyl value* | 0.2 | 0.2 | 0.3 |
| | Acid value | 0.02 | 0.02 | 0.02 |
| | pH | 6.1 | 5.9 | 5.9 |
| | Odor | A | A | A |
| Control 9 | Peroxide value | 0.1 | 0.6 | 1.0 |
| | Carbonyl value* | 0.2 | 0.4 | 0.8 |
| | Acid value | 0.02 | 0.06 | 0.1 |
| | pH | 6.2 | 5.8 | 5.6 |
| | Odor | A | A | B |

EXAMPLE 10

In a stainless steel reactor having an inner volume of 1,000 ml, 393 g of an averagely 3-mole ethoxylate of secondary alcohol of 12 to 14 carbon atoms having an average molecular weight of 333 (produced by Nippon Shokubai Kagaku Kogyo Co., Ltd. and marketed under the registered trademark designation of "Softanol-30"), 1.0 g of potassium hydroxide as a catalyst, and 207 g of ethylene oxide were heated at 150° C. under pressure of 6.0 kg/cm$^2$G for reaction. The averagely 7-mole etyylene oxide adduct of secondary alcohol obtained as the result and 3.3 g of an aqueous 50 wt% lactic acid solution added thereto were thoroughly stirred. The secondary alcohol ethoxylate obtained as the result was tested for the effect of aging. The results are shown in Table 10.

CONTROL 10

An averagely 7-mole ethylene oxide adduct of secondary alcohol obtained by following the procedure of Example 10 and 1.1 g of acetic acid added thereto were thoroughly stirred instead of lactic acid. The secondary alcohol ethoxylate obtained as the result was tested for the effect of aging. The results are shown in Table 10.

TABLE 10

| Example | Item of test | Change by aging (number of days passed) | | |
|---|---|---|---|---|
| | | 0 | 7 | 14 |
| Example 10 | Peroxide value | 0 | 0.3 | 0.5 |
| | Carbonyl value* | 0.1 | 0.1 | 0.2 |
| | Acid value | 0.01 | 0.01 | 0.02 |
| | pH | 6.2 | 6.2 | 6.2 |
| | Odor | A | A | A |
| Control 10 | Peroxide value | 0 | 0.5 | 0.9 |
| | Carbonyl value* | 0.1 | 0.3 | 0.7 |
| | Acid value | 0.01 | 0.07 | 0.1 |
| | pH | 6.3 | 5.9 | 5.5 |
| | Odor | A | A | B |

EXAMPLE 11

In a stainless steel reactor having an inner volume of 1,000 ml, 274 g of an averagely 3-mole ethoxylate of secondary alcohol of 12 to 14 carbon atoms having an average molecular weight of 333 (produced by Nippon Shokubai Kagaku Kogyo Co., Ltd. and marketed under the registered trademark designation of "Softanol-30"), 0.6 g of sodium hydroxide as a catalyst, and 326 g of ethylene oxide were heated at 150° C. under pressure of 6.0 kg/cm$^2$G for reaction. The averagely 12-mole ethylene oxide adduct of secondary alcohol obtained as the result and 2.8 g of an aqueous 50 wt% lactic acid solution added thereto were thoroughly stirred. The secondary alcohol ethoxylate obtained as the result was tested for the effect of aging. The results are shown in Table 11.

CONTROL 11

An averagely 12-mole ethylene oxide adduct of secondary alcohol obtained by following the procedure of Example 11 and 0.9 g of acetic acid added thereto were thoroughly stirred instead of lactic acid. The secondary alcohol ethoxylate obtained as the result was tested for the effect of aging. The results are shown in Table 11.

TABLE 11

| Example | Item of test | Change by aging (number of days passed) | | |
|---|---|---|---|---|
| | | 0 | 7 | 14 |
| Example 11 | Peroxide value | 0.1 | 0.5 | 0.8 |
| | Carbonyl value* | 0.1 | 0.1 | 0.1 |
| | Acid value | 0.02 | 0.03 | 0.03 |
| | pH | 6.2 | 6.1 | 6.0 |
| | Odor | A | A | A |
| Control 11 | Peroxide value | 0.1 | 0.7 | 1.2 |
| | Carbonyl value* | 0.1 | 0.4 | 0.9 |
| | Acid value | 0.02 | 0.07 | 0.1 |
| | pH | 6.2 | 5.6 | 5.5 |
| | Odor | A | A | B |

EXAMPLE 12

In a stainless steel reactor having an inner volume of 1,000 ml, 381 g of an averagely 7-mole ethoxylate of secondary alcohol of 10 to 12 carbon atoms having an average molecular weight of 306 (produced by Nippon Shokubai Kagaku Kogyo Co., Ltd. and marketed under the registered trademark designation of "Softanol L-30"), 0.6 g of sodium hydroxide as a catalyst, and 219 g of ethylene oxide were heated at 150° C. under pressure of 6.0 kg/cm$^2$G for reaction. The averagely 7-mole ethylene oxide adduct of secondary alcohol obtained as the result and 2.8 g of an aqueous 50 wt% lactic acid solution added thereto were thoroughly stirred. The secondary alcohol ethoxylate obtained as the result was tested for the effect of aging. The results are shown in Table 2.

Control 12

An averagely 7-mole ethylene oxide adduct of secondary alcohol obtained by following the procedure of Example 12 and 0.9 g of acetic acid added thereto were thoroughly stirred instead of lactic acid. The secondary alcohol ethoxylate obtained as the result was tested for the effect of aging. The results are shown in Table 12.

TABLE 12

| Example | Item of test | Change by aging (number of days passed) | | |
|---|---|---|---|---|
| | | 0 | 7 | 14 |
| Example 12 | Peroxide value | 0.2 | 0.5 | 0.8 |
| | Carbonyl value* | 0.1 | 0.1 | 0.1 |
| | Acid value | 0.03 | 0.04 | 0.04 |
| | pH | 6.1 | 6.0 | 6.0 |
| | Odor | A | A | A |
| Control 12 | Peroxide value | 0.2 | 0.7 | 1.5 |
| | Carbonyl value* | 0.1 | 0.5 | 0.8 |
| | Acid value | 0.04 | 0.08 | 0.1 |
| | pH | 6.1 | 5.7 | 5.5 |
| | Odor | A | B | B |

EXAMPLE 13

In a stainless steel reactor having an inner volume of 1,000 ml, 393 g of an averagely 3-mole ethoxylate of secondary alcohol of 12 to 14 carbon atoms having an average molecular weight of 333 (produced by Nippon Shokubai Kagaku Kogyo Co., Ltd. and marketed under the registered trademark designation of "Softanol-30"), 0.6 g of sodium hydroxide as a catalyst, and 207 g of ethylene oxide were heated at 150° C. under pressure of 6.0 kg/cm$^2$G for reaction. The averagely 7-mole ethylene oxide adduct of secondary alcohol obtained as the result and 12 g of Kyowado 600 BUPS added thereto were transferred into a filter precoated with diatomaceous earth and treated therein for removal of Kyowado 600 BUPS which had adsorbed the catalyst. The averagely 7-mole ethylene oxide separated by the filtration and 3.5 g of an aqueous 50 wt% sodium lactate solution added thereto were thoroughly stirred. The resultant secondary alcohol ethoxylate obtained as the result was tested for the effect of aging. The results are shown in Table 13.

CONTROL 13

An averagely 7-mole ethylene oxide adduct of secondary alcohol obtained by following the procedure of Example 13 and 12 g of Kyowado 600 BUPS added thereto were heated at 80° C. for 30 minutes, instead of sodium lactate. The resultant mixture was transferred into a filter precoated with diatomaceous earth and treated therein for removal of Kyowado 600 BUPS which had adsorbed the catalyst. The resultant secondary alcohol ethoxylate was tested for the effect of aging. The results are shown in Table 13.

TABLE 13

| Example | Item of test | Change by aging (number of days passed) | | |
|---|---|---|---|---|
| | | 0 | 7 | 14 |
| Example 13 | Peroxide value | 0.1 | 0.4 | 0.7 |
| | Carbonyl value* | 0.2 | 0.2 | 0.3 |
| | Acid value | 0.01 | 0.02 | 0.03 |
| | pH | 6.5 | 6.4 | 6.4 |
| | Odor | A | A | A |
| Control 13 | Peroxide value | 0.1 | 0.5 | 0.9 |
| | Carbonyl value* | 0.2 | 0.4 | 0.8 |
| | Acid value | 0.01 | 0.06 | 0.08 |
| | pH | 6.3 | 5.9 | 5.6 |
| | Odor | A | A | B |

EXAMPLE 14

In an autoclave having an inner volume of 1,500 ml and provided with a thermometer, a pressure gauge, and a stirrer, 590 g of random secondary alcohol of 12 to 14 carbon atoms (hydroxyl value 279) was admixed with 3.2 g of a boron trifluoride ether complex as an acid catalyst and, with the air entrapped in the autoclave amply displaced with nitrogen, the resultant mixture was heated to 50° C. and propoxylated with 410 g of propylene oxide introduced therein. The reaction solution so produced was cleaned by heating with an aqueous solution of 4 moles of sodium hydroxide per mole of boron trifluoride contained in the reaction solution and further washed two times with water for removal of the catalyst. The reaction solution was dehydrated and then distilled under a vacuum of 10 mmHg until the unaltered alcohol content fell below 1.0% by weight. The propoxylate so obtained had a hydroxyl value of 150 and an average number of moles of propylene oxide adduct of 3.0.

Then, in the same autoclave as used in the propoxylation described above, 485 g of the aforementioned propoxylate was admixed with 1 g of potassium hydroxide and, with the air entrapped in the autoclave amply displaced with nitrogen, the resultant mixture was heated to 140° C. and caused to react with 514 g of ethylene oxide added thereto. Then, the resultant reaction solution was neutralized with 3.2 g of an aqueous 50 wt% lactic acid solution, to afford an adduct consisting of an average of 3 moles of propylene oxide and an average of 9 moles of ethylene oxide. The alkylene oxide adduct so obtained was tested for the effect of aging. The results are shown in Table 14.

CONTROL 14

The procedure of Example 14 was repeated, except that 1.5 g of acetic acid was used in place of the aqueous lactic acid solution. The results are shown in Table 14.

CONTROL 15

The procedure of Example 14 was repeated, except that 1.1 g of an aqueous 85 wt% phosphoric acid solution was used in place of the aqueous lactic acid solution. The results are shown in Table 14.

TABLE 14

| Example | Item of test | Change by aging (number of days passed) | | | |
|---|---|---|---|---|---|
| | | 0 | 7 | 14 | 35 |
| Example 14 | Carbonyl value* | 0.2 | 0.2 | 0.2 | 0.2 |
| | Acid value | 0.02 | 0.03 | 0.03 | 0.04 |
| | pH | 6.2 | 6.2 | 6.2 | 6.1 |
| | Odor | A | A | A | A |
| Control 14 | Carbonyl value* | 0.2 | 0.7 | 1.0 | 1.9 |
| | Acid value | 0.02 | 0.06 | 0.10 | 0.20 |
| | pH | 6.2 | 6.0 | 5.7 | 5.3 |
| | Odor | A | A | B | C |
| Control 15 | Carbonyl value* | 0.2 | 0.6 | 0.9 | 1.7 |
| | Acid value | 0.04 | 0.09 | 0.13 | 0.24 |
| | pH | 6.1 | 5.8 | 5.6 | 5.3 |
| | Odor | A | A | B | C |

*Carbonyl value: mg KOH/g

EXAMPLE 15

In an autoclave having an inner volume of 1,500 ml and provided with a thermometer, a pressure gauge, and a stirrer, 590 g of primary alcohol of 11 to 15 carbon atoms having an average molecular weight of 202 (hydroxyl value 279) (produced by Mitsubishi Chemical and marketed under the registered trademark designation of "Diadol") was admixed with 3.2 g a boron trifluoride ether complex as an acid catalyst and, with the air entrapped in the autoclave amply with nitrogen, the resultant mixture was heated to 50° C. and propoxylated with 410 g of propylene oxide introduced therein. The reaction solution so obtained was cleaned by heating with an aqueous solution of 4 moles of sodium hydroxide per mole of boron trifluoride contained in the reaction solution and then washed two times with water for removal of the catalyst. The reaction solution was dehydrated and then distilled under a vacuum of 10 mmHg until the unaltered alcohol content fell below 1.0% by weight. The propoxylate so obtained had a hydroxyl value of 150 and an average number of moles of propylene oxide adduct of 3.0.

In the same autoclave as used in the propoxylation described above, 485 g of the propoxylate was admixed with 1 g of potassium hydroxide and, with the air entrapped in the autoclave amply displaced with nitrogen, the resultant mixture was heated to 140° C. and caused to react with 514 g of ethylene oxide added therein. Then, the resultant reaction solution was neutralized with 3.2 g of an aqueous 50 wt% lactic acid solution, to afford an adduct consisting of an average of 3 moles of propylene oxide and an average of 9 moles of ethylene oxide. The alkylene oxide adduct so obtained was tested for the effect of aging. The results are shown in Table 15.

CONTROL 16

The procedure of Example 15 was repeated, except that 1.5 g of acetic acid was sued in place of the aqueous lactic acid solution. The results are shown in Table 15.

CONTROL 17

The procedure of Example 15 was repeated, except that 1.1 g of an aqueous 85 wt% phosphoric acid solution was used in place of the aqueous lactic acid solution. The results are shown in Table 15.

TABLE 15

| Example | Item of test | Change by aging (number of days passed) | | | |
|---|---|---|---|---|---|
| | | 0 | 7 | 14 | 35 |
| Example 15 | Carbonyl value | 0.2 | 0.3 | 0.3 | 0.3 |
| | Acid value | 0.02 | 0.02 | 0.02 | 0.04 |
| | pH | 6.4 | 6.4 | 6.3 | 6.1 |
| | Odor | A | A | A | A |
| Control 16 | Carbonyl value | 0.3 | 0.7 | 1.4 | 2.5 |
| | Acid value | 0.02 | 0.05 | 0.10 | 0.24 |
| | pH | 6.4 | 6.1 | 5.8 | 5.4 |
| | Odor | A | A | B | C |
| Control 17 | Carbonyl value | 0.3 | 0.6 | 1.0 | 2.0 |
| | Acid value | 0.03 | 0.05 | 0.08 | 0.20 |
| | pH | 6.4 | 6.1 | 5.9 | 5.5 |
| | Odor | A | A | B | C |

EXAMPLE 16

In an autoclave having an inner volume of 1,500 ml and provided with a thermometer, a pressure gauge, and a stirrer, 432 g of an averagely 3-mole random secondary alcohol ethylene oxide adduct of 12 to 14 carbon atoms having an average molecular weihgt of 333 (produced by Nippon Shokubai Kagaku Kogyo Co., Ltd. and marketed under the registered trademark designation of "Softanol-30") was admixed with 1.0 g of sodium hydroxide as a catalyst and, with the air entrapped in the autoclave amply displaced with nitrogen, the resultant mixture was heated to 130° to 150° C. under pressure of 6 kg/cm²G and then ethoxylated with 229 g of ethylene oxide introduced therein. The resultant reaction solution was further subjected to addition reaction with 339 g of propylene oxide. The resultant adduct was neutralized with 4.5 g of an aqueous 50 wt% lactic acid solution. Consequently, there was obtained an adduct consisting of an average of 7 moles of ethylene oxide of random secondary alcohol of 12 to 14 carbon atoms and an average of 4.5 moles of propylene oxide. The alkylene oxide adduct so obtained was tested for the effect of aging. The results are shown in Table 16.

CONTROL 18

The procedure of Example 15 was repeated, except that 1.5 g of acetic acid was used in place of the aqueous lactic acid solution. The results are shown in Table 16.

CONTROL 19

The procedure of Example 16 was repeated, except that 1.5 g of an aqueous 85 wt% phosphoric acid solution was used in place of the aqueous lactic acid solution. The results are shown in Table 16.

TABLE 16

| Example | Item of test | Change by aging (number of days passed) | | | |
|---|---|---|---|---|---|
| | | 0 | 7 | 14 | 35 |
| Example 16 | Carbonyl value* | 0.2 | 0.2 | 0.2 | 0.3 |
| | Acid value | 0.02 | 0.02 | 0.03 | 0.05 |
| | pH | 6.4 | 6.4 | 6.2 | 6.1 |
| | Appearance | ⊙ | ⊙ | ⊙ | ⊙ |
| | Odor | A | A | A | A |
| Control 18 | Carbonyl value* | 0.3 | 0.8 | 1.2 | 2.0 |
| | Acid value | 0.02 | 0.05 | 0.09 | 0.22 |
| | pH | 6.4 | 6.1 | 5.7 | 5.2 |
| | Appearance | x | x | x | x |
| | Odor | A | A | B | C |
| Control 19 | Carbonyl value* | 0.2 | 0.4 | 0.7 | 1.5 |
| | Acid value | 0.03 | 0.07 | 0.10 | 0.20 |
| | pH | 6.2 | 5.9 | 5.7 | 5.1 |
| | Appearance | x | x | x | x |
| | Odor | A | A | B | C |

EXAMPLE 17

In an autoclave having an inner volume of 1,500 ml and provided with a thermometer, a pressure gauge, and a stirrer, 261 g of primary alcohol of 11 to 15 carbon atoms having an average molecular weihgt of 202 (produced by Mitsubishi Chemical and marketed under the registered trademark designation of "Diadol") was admixed with 1.0 g of sodium hydroxide as a catalyst and, with the air entrapped in the autoclave amply displaced with nitrogen, the resultant mixture was heated to 130° to 150° C. under pressure of 6 kg/cm²G and then ethoxylated with 400 g of ethylene oxide introduced therein. The resultant reaction solution was further subjected to addition reaction with 339 g of propylene oxide. The resultant adduct was neutralized with 4.5 g of an aqueous 50 wt% lactic acid solution, to afford an adduct consisting of an average of 7 moles of ethylene oxide and an average of 4.5 moles of propylene oxide.

The alkylene oxide adduct so obtained was tested for the effect of aging. The results are shown in Table 17.

CONTROL 20

The procedure of Example 17 was repeated, except that 1.5 g of acetic acid was used in place of the aqueous lactic acid solution. The results are shown in Table 17.

CONTROL 21

The procedure of Example 17 was repeated, except that 1.5 g of an aqueous 85 wt% phosphoric acid solution was used in place of the aqueous lactic acid solution. The results are shown in Table 17.

TABLE 17

| Example | Item of test | Change by aging (number of days passed) | | | |
|---|---|---|---|---|---|
| | | 0 | 7 | 14 | 35 |
| Example 17 | Carbonyl value | 0.2 | 0.2 | 0.2 | 0.3 |
| | Acid value | 0.03 | 0.03 | 0.05 | 0.07 |
| | pH | 6.2 | 6.2 | 6.1 | 6.1 |
| | Appearance | ⊚ | ⊚ | ⊚ | ⊚ |
| | Odor | A | A | A | A |
| Control 20 | Carbonyl value | 0.2 | 0.6 | 1.4 | 2.5 |
| | Acid value | 0.02 | 0.08 | 0.1 | 0.20 |
| | pH | 6.3 | 6.0 | 5.6 | 5.3 |
| | Appearance | x | x | x | x |
| | Odor | A | A | B | C |
| Control 21 | Carbonyl value | 0.3 | 0.5 | 1.1 | 1.8 |
| | Acid value | 0.02 | 0.06 | 0.09 | 0.18 |
| | pH | 6.2 | 5.9 | 5.7 | 5.4 |
| | Appearance | x | x | x | x |
| | Odor | A | A | B | C |

EXAMPLE 18

In an autoclave having an inner volume of 1,500 ml and provided with a thermometer, a pressure gauge, and a stirrer, 257 g of primary alcohol of 12 to 16 carbon atoms having an average molecular weihgt of 197, which alcohol was obtained by hydrogenation of coconut oil, was admixed with 1.0 g of sodium hydroxide as a catalyst and, with the air entrapped in the autoclave amply displaced with nitrogen, the resultant mixture was heated to 130° to 150° C. under pressure of 6 kg/cm$^2$G and then ethoxylated with 402 g of ethylene oxide introduced therein. The resultant reaction solution was neutralized with 4.5 g of an aqueous 50 wt% lactic acid solution. Consequenlty, there was obtained an adduct consisting of an average of 7 moles of ethyene oxide of primary coconut alcohol of 12 to 16 carbon aotms and an average of 4.5 moles of propylene oxide.

The alkylene oxide adduct so obtained was tested for the effect of aging. The results are shown in Table 18.

CONTROL 22

The procedure of Example 18 was repeated, except that 1.5 g of acetic acid was used in place of the aqueous lactic acid solution. The results are shown in Table 18.

CONTROL 23

The procedure of Example 18 was repeated, except that 1.5 g of an aqueous 85 wt% phosphoric acid solution was used in place of the aqueous lactic acid solution. The results are shown in Table 18.

TABLE 18

| Example | Item of test | Change by aging (number of days passed) | | | |
|---|---|---|---|---|---|
| | | 0 | 7 | 14 | 35 |
| Example 18 | Carbonyl value | 0.3 | 0.3 | 0.3 | 0.4 |
| | Acid value | 0.02 | 0.02 | 0.03 | 0.05 |
| | pH | 6.2 | 6.2 | 6.2 | 6.1 |
| | Appearance | ⊚ | ⊚ | ⊚ | ⊚ |
| | Odor | A | A | A | A |
| Control 22 | Carbonyl value | 0.2 | 0.6 | 1.3 | 2.5 |
| | Acid value | 0.02 | 0.08 | 0.12 | 0.25 |
| | pH | 6.2 | 6.0 | 5.8 | 5.7 |
| | Appearance | x | x | x | x |
| | Odor | A | A | B | C |
| Control 23 | Carbonyl value | 0.2 | 0.5 | 0.9 | 1.8 |
| | Acid value | 0.02 | 0.07 | 0.10 | 0.20 |
| | pH | 6.1 | 5.9 | 5.6 | 5.4 |
| | Appearance | x | x | x | x |

TABLE 18-continued

| Example | Item of test | Change by aging (number of days passed) | | | |
|---|---|---|---|---|---|
| | | 0 | 7 | 14 | 35 |
| | Odor | A | A | B | C |

EXAMPLE 19

In an autoclave having an inner volume of 1,500 ml and provided with a thermometer, a pressure gauge, and a stirrer, 590 g of secondary alcohol of 12 to 14 carbon atoms (hydroxyl value 279) was admixed with 3.2 g of boron trifluoride ether complex as an acid catalyst and, with the air entrapped in the autoclave amply displaced with nitrogen, the resultant mixture was heated to 50° C. and then propoxylated with 410 g of propylene oxide introduced therein. The resultant reaction solution was cleaned by heating with an aqueous solution of 4 moles of sodium hydroxide per mole of boron trifluoride contained in the reaction solution and then two times with water for removal of the catalyst.

The reaction solution was dehydrated and then distilled under a vacuum of 10 mmHg until the unaltered alcohol content fell below 1.0% by weight. The propoxylate so obtained had a hydroxyl value of 150 and an average number of moles of propylene oxide adduct of 3.0.

Then, in the same autoclave as used in the propoxylation described above, 485 g of the propoxylate was admixed with 1 g of potassium hydroxide and, with the air entrapped in the autoclave amply displaced with nitrogen, the resultant mixture was heated to 140° C. and then caused to react with 514 g of ethylene oxide. As the result, there was obtained an adduct consisting of an average of 3 moles of propylene oxide and an average of 9 moles of ethylene oxide. This adduct and 12 g of Kyowado 600 BUPS (synthetic adsorbent produced by Kyowa Chemical Industry Co., Ltd.) added thereto were stirred at 80° C. for 30 minutes. The mixture was transferred into a filter precoated with diatomaceous earth and treated therein for removal of Kyowado 600 BUPS which had adsorbed the catalyst. Then, the alkylene oxide adduct separated by the filtration and 3.5 g of an aqueous 50 wt% sodium lactate solution added thereto were thoroughly stirred. The alkylene oxide adduct so obtained was tested for the effect of aging. The results are shown in Table 19.

CONTROL 24

The procedure of Example 19 was repeated, except that the addition of the aqueous sodium lactate solution was omitted. The results are shown in Table 19.

TABLE 19

| Example | Item of test | Change by aging (number of days passed) | | | |
|---|---|---|---|---|---|
| | | 0 | 7 | 14 | 35 |
| Example 19 | Carbonyl value* | 0.2 | 0.2 | 0.3 | 0.4 |
| | Acid value | 0 | 0.01 | 0.02 | 0.02 |
| | pH | 6.6 | 6.6 | 6.5 | 6.3 |
| | Appearance | ⊚ | ⊚ | ⊚ | ⊚ |
| | Odor | A | A | A | A |
| Control 24 | Carbonyl value* | 0.2 | 0.4 | 0.7 | 1.2 |
| | Acid value | 0 | 0.02 | 0.04 | 0.10 |
| | pH | 6.5 | 6.3 | 6.0 | 5.8 |
| | Appearance | x | x | x | x |
| | Odor | A | A | A | C |

EXAMPLE 20

In a stainless steel reactor having an inner volume of 1,000 ml and provided with a thermometer, a pressure gauge, and a stirrer, 124 g of monoethylene glycol, 0.6 g of sodium hydroxide as a catalyst, and 476 g of ethylene oxide were heated at 150° C. under pressure of 6.0 kg/cm$^2$G for reaction. The resultant polyethylene glycol of an average molecular weight of 300 and 2.7 g of an aqueous 50 wt% lactic acid solution added thereto were thoroughly stirred. The polyethylene glycol so obtained was tested for the effect of aging. The results are shown in Table 20.

CONTROL 25

The procedure of Example 20 was repeated, except that 0.9 g of acetic acid was used in place of the aqueous lactic acid solution. The results are shown in Table 20.

CONTROL 26

The procedure of Example 20 was repeated, except that 0.9 g of an aqueous 85 wt% phosphoric acid solution was used in place of the aqueous lactic acid solution. The results are shown in Table 20.

TABLE 20

| Example | Item of test | Change by aging (number of days passed) | | | |
|---|---|---|---|---|---|
| | | 0 | 7 | 14 | 35 |
| Example 20 | Carbonyl value | 0.3 | 0.3 | 0.4 | 0.5 |
| | Acid value | 0.02 | 0.02 | 0.02 | 0.04 |
| | pH | 6.1 | 6.1 | 6.0 | 5.9 |
| | Odor | A | A | A | A |
| Control 25 | Carbonyl value | 0.3 | 0.11 | 1.8 | 4.1 |
| | Acid value | 0.02 | 0.08 | 0.15 | 0.35 |
| | pH | 6.1 | 5.9 | 5.7 | 5.3 |
| | Odor | A | A | B | C |
| Control 26 | Carbonyl value | 0.3 | 0.9 | 1.7 | 3.8 |
| | Acid value | 0.02 | 0.06 | 0.12 | 0.30 |
| | pH | 6.0 | 5.9 | 5.7 | 5.3 |
| | Odor | A | A | B | C |

EXAMPLE 21

In a stainless steel reactor having an inner volume of 1,000 ml and provided with a thermometer, a pressure gauge, and a stirrer, 112 g of propylene glycol, 0.6 g of sodium hydroxide as a catalyst, and 481 g of ethylene oxide were heated at 150° C. under pressure of 6.0 kg/cm$^2$G for reaction. The resultant averagely 7-mole ethylene oxide adduct of propylene glycol and 1.9 g of an aqueous 50 wt% lactic acid solution added thereto were thoroughly stirred. The propylene glycol ethoxylate so obtained was tested for the effect of aging. The results are shown in Table 21.

CONTROL 27

The procedure of Example 21 was repeated, except that 0.6 g of acetic acid was used in place of the aqueous lactic acid solution. The results are shown in Table 21.

CONTROL 28

The procedure of Example 21 was repeated, except that 0.65 g of an aqueous 85 wt% phosphoric acid solution in place of the aqueous lactic acid solution. The results are shown in Table 21.

TABLE 21

| Example | Item of test | Change by aging (number of days passed) | | | |
|---|---|---|---|---|---|
| | | 0 | 7 | 14 | 35 |
| Example 21 | Carbonyl value | 0.2 | 0.2 | 0.3 | 0.4 |
| | Acid value | 0.01 | 0.02 | 0.02 | 0.03 |
| | pH | 6.3 | 6.3 | 6.3 | 6.2 |
| | Odor | A | A | A | A |
| Control 27 | Carbonyl value | 0.2 | 0.8 | 1.5 | 3.5 |
| | Acid value | 0.01 | 0.05 | 0.13 | 0.30 |
| | pH | 6.4 | 6.1 | 5.8 | 5.4 |
| | Odor | A | A | B | C |
| Control 28 | Carbonyl value | 0.2 | 0.7 | 1.4 | 3.1 |
| | Acid value | 0.02 | 0.05 | 0.12 | 0.25 |
| | pH | 6.3 | 6.2 | 5.9 | 5.5 |
| | Odor | A | A | B | C |

EXAMPLE 22

In a stainless steel reactor having an inner volume of 1,000 ml and provided with a thermometer, a pressure gauge, and a stirrer, 90 g of polyethylene glycol having an average molecular weight of 300, 0.6 g of potassium hydroxide as a catalyst and 510 g of ethylene oxide were heated at 150° C. under pressure of 6.0 kg/cm$^2$G for reaction. The resultant polyethylene glycol having an average molecular weight of 2,000 and 1.9 g of an aqueous 50 wt% lactic acid solution added thereto were thoroughly stirred. The polyethylene glycol so obtained was tested for the effect of aging. The results are shown in Table 22.

CONTROL 29

The procedure of Example 22 was repeated, except that 0.6 g of acetic acid was used in place of the aqueous lactic acid solution. The results are shown in Table 22.

CONTROL 30

The procedure of Example 22 was repeated, except that 0.65 g of an aqueous 85 wt% phosphoric acid solution was used in place of the aqueous lactic acid solution. The results are shown in Table 22.

TABLE 22

| Example | Item of test | Change by aging (number of days passed) | | | |
|---|---|---|---|---|---|
| | | 0 | 7 | 14 | 35 |
| Example 22 | Carbonyl value | 0.2 | 0.2 | 0.2 | 0.4 |
| | Acid value | 0.01 | 0.02 | 0.02 | 0.04 |
| | pH | 6.3 | 6.3 | 6.2 | 6.1 |
| | Odor | A | A | A | A |
| Control 29 | Carbonyl value | 0.2 | 0.8 | 2.0 | 4.4 |
| | Acid value | 0.02 | 0.07 | 0.18 | 0.45 |
| | pH | 6.3 | 6.0 | 5.6 | 5.1 |
| | Odor | A | A | B | C |
| Control 30 | Carbonyl value | 0.2 | 0.7 | 1.8 | 4.3 |
| | Acid value | 0.02 | 0.06 | 0.12 | 0.32 |
| | pH | 6.2 | 6.0 | 5.8 | 5.2 |
| | Odor | A | A | B | C |

EXAMPLE 23

In a stainless steel autoclave having an inner volume of 1,000 ml and provided with a thermometer, a pressure gauge, and a stirrer, 84 g of propylene glycol, 1.8 g of potassium hydroxide as a catalyst, and 516 g of propylene oxide were heated at 120° C. under pressure of 6.0 kg/cm$^2$G for reaction. After the reaction, the reaction solution was deaerated at 120° C. under pressure of 50 Torrs for three hours. The resultant polypropylene glycol having an average molecular weight of 540 and 5.7 g of an aqueous 50 wt% lactic acid solution were thoroughly stirred. The polypropylene glycol so obtained was tested for the effect of aging. The results are shown in Table 23.

CONTROL 31

The procedure of Example 23 was repeated, except that 1.5 g of acetic acid was used in place of the aqueous lactic acid solution. The results are shown in Table 23.

CONTROL 32

The procedure of Example 23 was repeated, except that 1.9 g of an aqueous 85 wt% phosphoric acid solution was in place of the aqueous solution of lactic acid. The results are shown in Table 23.

TABLE 23

| Example | Item of test | Change by aging (number of days passed) | | | |
|---|---|---|---|---|---|
| | | 0 | 7 | 14 | 35 |
| Example 23 | Carbonyl value | 0.2 | 0.2 | 0.3 | 0.3 |
| | Acid value | 0.02 | 0.02 | 0.02 | 0.04 |
| | pH | 6.3 | 6.3 | 6.2 | 6.1 |
| | Odor | A | A | A | A |
| Control 31 | Carbonyl value | 0.2 | 0.6 | 0.8 | 1.9 |
| | Acid value | 0.02 | 0.04 | 0.06 | 0.15 |
| | pH | 6.3 | 6.1 | 6.0 | 5.6 |
| | Odor | A | A | A | B |
| Control 32 | Carbonyl value | 0.2 | 0.3 | 0.7 | 1.7 |
| | Acid value | 0.02 | 0.03 | 0.05 | 0.13 |
| | pH | 6.2 | 6.0 | 5.9 | 5.6 |
| | Odor | A | A | A | B |

EXAMPLE 24

In a stainless steel autoclave having an inner volume of 1,000 ml and provided with a thermometer, a pressure gauge, and a stirrer, 84 g of propylene glycol, 1.8 g of potassium hydroxide as a catalyst, and 516 g of propylene oxide were heated at 120° C. under pressure of 6.0 kg/cm²G for reaction. From the autoclave, the portion 108 g of the produced polypropylene glycol having an averge molecular weight of 540 was drawn out. The remaining portion 432 g of the produced polypropylene glycol in the autoclave and 168 g of ethylene oxide added thereto were heated at 120° C. under pressure of 6.0 kg/cm²G for reaction. The resultant ethylene oxide adduct of polypropylene glycol having an average molecular weight of 750 and 4.2 g of an aqueous 50 wt% lactic acid solution were thoroughly stirred. The ethylene oxide adduct of propylene glycol obtained as the result was tested for the effect of aging. The results are shown in Table 24.

CONTROL 33

The procedure of Example 24 was repeated, except that 1.4 g of acetic acid was used in place of the aqueous lactic acid solution. The results are shown in Table 24.

CONTROL 33

The procedure of Example 24 was repeated, except that 1.4 g of an aqueous 85 wt% phosphoric acid solution was used in place of the aqueous lactic acid solution. The results are shown in Table 24.

TABLE 24

| Example | Item of test | Change by aging (number of days passed) | | | |
|---|---|---|---|---|---|
| | | 0 | 7 | 14 | 35 |
| Example 24 | Carbonyl value | 0.3 | 0.3 | 0.3 | 0.4 |
| | Acid value | 0.03 | 0.03 | 0.05 | 0.06 |
| | pH | 6.2 | 6.2 | 6.1 | 6.0 |
| | Odor | A | A | A | A |
| Control 33 | Carbonyl value | 0.2 | 0.5 | 1.0 | 2.6 |
| | Acid value | 0.03 | 0.05 | 0.08 | 0.18 |
| | pH | 6.3 | 6.0 | 5.8 | 5.5 |
| | Odor | A | A | B | C |
| Control 34 | Carbonyl value | 0.3 | 0.5 | 0.9 | 2.4 |
| | Acid value | 0.02 | 0.05 | 0.08 | 0.17 |
| | pH | 6.2 | 6.0 | 5.9 | 5.6 |
| | Odor | A | A | B | C |

EXAMPLE 25

In a stainless steel autoclave having an inner volume of 1,000 ml and provided with a thermometer, a pressure gauge, and a stirrer, 510 g of condensate of ethylene oxide and a hydrophobic substrate produced by the condensation of propylene oxide and propylene glycol (produced by Asahi Denka Kogyo K.K. and marketed under the trademark designation of "Pluronic L-62") and 0.6 g of potassium hydroxide as a catalyst, and 90 g of ethylene oxide were heated at 150° C. under pressure of 6.0 kg/cm²G. The averagely 10-mole ethylene oxide adduct of Pluronic and 1.9 g of an aqueous 50 wt% lactic acid solution were thoroughly stirred. The Pluronic ethoxylate obtained as the result was tested for the effect of aging. The results are shown in Table 25.

CONTROL 35

The procedure of Example 25 was repeated, except that 0.6 g of acetic acid was used in place of the aqueous lactic acid solution. The results are shown in Table 25.

CONTROL 36

The procedure of Example 25 was repeated, except that 0.65 g of an aqueous 85 wt% phosphoric acid solution was used in place of the aqueous lactic acid solution. The results are shown in Table 25.

TABLE 25

| Example | Item of test | Change by aging (number of days passed) | | | |
|---|---|---|---|---|---|
| | | 0 | 7 | 14 | 35 |
| Example 25 | Carbonyl value | 0.5 | 0.5 | 0.5 | 0.6 |
| | Acid value | 0.03 | 0.03 | 0.04 | 0.05 |
| | pH | 6.3 | 6.2 | 6.2 | 6.1 |
| | Odor | A | A | A | A |
| Control 35 | Carbonyl value | 0.5 | 0.9 | 1.5 | 3.1 |
| | Acid value | 0.03 | 0.05 | 0.09 | 0.20 |
| | pH | 6.1 | 6.0 | 5.8 | 5.5 |
| | Odor | A | A | B | C |
| Control 36 | Carbonyl value | 0.5 | 0.8 | 1.3 | 2.8 |
| | Acid value | 0.04 | 0.06 | 0.08 | 0.18 |
| | pH | 6.2 | 6.0 | 5.8 | 5.5 |
| | Odor | A | A | B | C |

EXAMPLE 26

In a stainless steel autoclave having an inner volume of 1,000 ml and provided with a thermometer, a pressure gauge, and a stirrer, 84 g of propylene glycol, 1.8 g of potassium hydroxide, and 516 g of propylene oxide was heated at 120° C. under pressure of 6.0 kg/cm²G for reaction. From the autoclave, the portion 108 g of the resultant polypropylene glycol (600 g) having an average molecular weight of 540 was drawn out. The remaining portion 432 g of the polypropylene glycol in the autoclave and 168 g of ethylene oxide added thereto were heated at 150° C. under pressure of 6.0 kg/cm²G. The produced ethylene oxide adduct of polypropylene glycol having an avearge molecular weight of 750 and 16 g of Kyowado 600 BUPS (synthetic adsorbent produced by Kyowa Chemical Industry Co., Ltd.) added thereto were stirred at 80° C. for 30 minutes. The resultant mixture was transferred into a filter precoated with diatomaceous earth and treated therein for removal of Kyowado 600 PUPS which had adsorbed the catalyst. Then, the produced ethylene oxide adduct of polypropylene glycol separated by the filtration and 5.2 g of an aqueous 50 wt% sodium lactate solution added thereto were filtration stirred. The ethylene oxide adduct of polypropylene glycol obtained as the result was tested for the effect of aging. The results are shown in Table 26.

CONTROL 37

The procedure of Example 26 was repeated, except that the addition of sodium lactate was omitted. The results are shown in Table 26.

TABLE 26

| Example | Item of test | Change by aging (number of days passed) | | | |
|---|---|---|---|---|---|
| | | 0 | 7 | 14 | 35 |
| Example 26 | Carbonyl value | 0.3 | 0.3 | 0.3 | 0.4 |
| | Acid value | 0.01 | 0.01 | 0.01 | 0.03 |
| | pH | 6.5 | 6.5 | 6.4 | 6.4 |
| | Odor | A | A | A | A |
| Control 37 | Carbonyl value | 0.3 | 0.4 | 0.7 | 1.7 |
| | Acid value | 0.01 | 0.03 | 0.05 | 0.12 |
| | pH | 6.4 | 6.3 | 6.1 | 5.8 |
| | Odor | A | A | A | B |

EXAMPLE 27

In a stainless steel reactor having an inner volume of 1,000 ml and provided with a thermometer, a pressure gauge, and a stirrer, 200 g of nonylphenol (molecular weight 221), 0.6 g of sodium hydroxide as a catalyst, and 400 g of ethylene oxide were heated at 150° C. under pressure of 6.0 kg/cm²G of reaction. The resultant averagely 10-mole ethylene oxide adduct of nonylphenol and 2.7 g of an aqueous 50 wt% lactic acid solution added thereto were thoroughly stirred. The nonylphenol ethoxylate obtained as the result was tested for the effect of aging. The results are shown in Table 27.

CONTROL 38

The procedure of Example 27 was repeated, except that 0.9 g of acetic acid was used in place of the aqueous lactic acid solution. The results are shown in Table 27.

CONTROL 39

The procedure of Example 27 was repeated, except that 0.9 g of an aqueous 85 wt% phosphoric acid solution was used in place of the aqueous lactic acid solution. The results are shown in Table 27.

TABLE 27

| Example | Item of test | Change by aging (number of days passed) | | | |
|---|---|---|---|---|---|
| | | 0 | 7 | 14 | 35 |
| Example 27 | Carbonyl value | 0.1 | 0.1 | 0.2 | 0.3 |
| | Acid value | 0.01 | 0.01 | 0.01 | 0.02 |
| | pH | 6.6 | 6.6 | 6.5 | 6.4 |
| | Odor | A | A | A | A |

TABLE 27-continued

| Example | Item of test | Change by aging (number of days passed) | | | |
|---|---|---|---|---|---|
| | | 0 | 7 | 14 | 35 |
| Control 38 | Carbonyl value | 0.1 | 0.3 | 0.5 | 0.8 |
| | Acid value | 0.01 | 0.03 | 0.08 | 0.20 |
| | pH | 6.5 | 6.3 | 6.0 | 5.7 |
| | Odor | A | A | B | C |
| Control 39 | Carbonyl value | 0.1 | 0.3 | 0.4 | 0.7 |
| | Acid value | 0.01 | 0.04 | 0.08 | 0.18 |
| | pH | 6.4 | 6.3 | 6.0 | 5.7 |
| | Odor | A | A | B | C |

EXAMPLE 28

In a stainless steel reactor having an inner volume of 1,000 ml and provided with a thermometer, a pressure gauge, and a stirrer, 376 g of nonylphenol (molecular weight 221), 0.6 g of sodium hydroxide as a catalyst, and 224 g of ethylene oxide were heated at 150° C. under pressure of 6.0 kg/cm²G for reaction. The resultant averagely 3.0-mole ethylene oxide adduct of nonylphenol and 2.7 g of an aqueous 50 wt% lactic acid solution added thereto were thoroughly stirred. The nonylphenol ethoxylate obtained as the result was tested for the effect of aging. the results are shown in Table 28.

Control 40

The procedure of Example 28 was repeated, except that 0.9 g of acetic acid was used in place of the aqueous lactic acid solution. The results are shown in Table 28.

CONTROL 41

The procedure of Example 28 was repeated, except that 0.9 g of an aqueous 85 wt% phosphoric acid solution was used in place of the aqueous lactic acid solution. The results are shown in Table 28.

TABLE 28

| Example | Item of test | Change by aging (number of days passed) | | | |
|---|---|---|---|---|---|
| | | 0 | 7 | 14 | 35 |
| Example 28 | Carbonyl value | 0.1 | 0.1 | 0.1 | 0.2 |
| | Acid value | 0.01 | 0.01 | 0.02 | 0.02 |
| | pH | 6.4 | 6.4 | 6.3 | 6.3 |
| | Odor | A | A | A | A |
| Control 40 | Carbonyl value | 0.1 | 0.3 | 0.5 | 0.9 |
| | Acid value | 0.01 | 0.04 | 0.07 | 0.18 |
| | pH | 6.4 | 6.2 | 6.0 | 5.6 |
| | Odor | A | ·A | B | C |
| Control 41 | Carbonyl value | 0.1 | 0.2 | 0.4 | 0.7 |
| | Acid value | 0.01 | 0.03 | 0.07 | 0.17 |
| | pH | 6.3 | 6.2 | 5.9 | 5.7 |
| | Odor | A | A | B | C |

Example 29

In a stainless steel reactor having an inner volume of 1,000 ml and provided with a thermometer, a pressure gauge, and a stirrer, 191 g of octylphenol (molecular weight 206), 0.6 g of potassium hydroxide, and 409 g of ethylene oxide were heated at 150° C. under pressure of 6.0 kg/cm²G for reaction. The resultant averagely 10-mole ethylene oxide adduct of octylphenol and 1.9 g of an aqueous 50 wt% lactic acid solution added thereto were thoroughly stirred. The octylphenol ethoxylate obtained as the result was tested for the effect of aging. the results are shown in Table 29.

CONTROL 42

The procedure of Example 29 was repeated, except that 0.6 g of acetic acid was used in place of the aqueous lactic acid solution. The results are shown in Table 29.

CONTROL 43

The procedure of Example 29 was repeated, except that 0.65 g of an aqueous 85 wt% phosphoric acid solution was used in place of the aqueous lactic acid solution. The results are shown in Table 29.

TABLE 29

| Example | Item of test | Change by aging (number of days passed) | | | |
|---|---|---|---|---|---|
| | | 0 | 7 | 14 | 35 |
| Example 29 | Carbonyl value | 0.1 | 0.1 | 0.1 | 0.2 |
| | Acid value | 0.02 | 0.02 | 0.02 | 0.03 |
| | pH | 6.4 | 6.4 | 6.3 | 6.3 |
| | Odor | A | A | A | A |
| Control 42 | Carbonyl value | 0.1 | 0.3 | 0.6 | 0.9 |
| | Acid value | 0.01 | 0.04 | 0.08 | 0.20 |
| | pH | 6.5 | 6.3 | 6.1 | 5.6 |
| | Odor | A | A | B | C |
| Control 43 | Carbonyl value | 0.1 | 0.2 | 0.5 | 0.9 |
| | Acid value | 0.01 | 0.03 | 0.06 | 0.16 |
| | pH | 6.5 | 6.3 | 6.1 | 5.7 |
| | Odor | A | A | B | C |

EXAMPLE 30

In a stainless steel reactor having an inner volume of 1,000 ml and provided with a thermometer, a pressure gauge, and a stirrer, 168 g of nonylphenol (molecular weight 221), 1.2 g of potassium hydroxide as a catalyst, and 132 g of propylene oxide were heated at 130° C. under pressure of 6.0 kg/cm$^2$G for reaction. The resultant averagely 3.0-mole propylene oxide adduct of nonylphenol and 300 g of ethylene oxide added thereto were heated at 150° C. under pressure of 6.0 kg/cm$^2$G for reaction. The resultant adduct consisting of an average of 3.0 moles of propylene oxide of nonylphenol and an average of 9.0 moles of ethylene oxide and 3.9 g of an aqueous 50 wt% lactic acid solution added thereto were thoroughly stirred. The resultant adduct consisting of an average of 3.0 moles of propylene oxide of nonylphenol and an average of 9.0 moles of ethylene oxide was tested for the effect of aging. The results are shown in Table 30.

CONTROL 44

The procedure of Example 30 was repeated, except that 1.3 g of acetic acid was used in place of the aqueous lactic acid solution. The results are shown in Table 30.

CONTROL 45

The procedure of Example 30 was repeated, except that 1.3 g of an aqueous 85 wt% phosphoric acid solution was used in place of the aqueous lactic acid solution. The results are shown in Table 30.

TABLE 30

| Example | Item of test | Change by aging (number of days passed) | | | |
|---|---|---|---|---|---|
| | | 0 | 7 | 14 | 35 |
| Example 30 | Carbonyl value | 0.1 | 0.1 | 0.2 | 0.2 |
| | Acid value | 0.01 | 0.01 | 0.02 | 0.03 |
| | pH | 6.5 | 6.5 | 6.4 | 6.3 |
| | Odor | A | A | A | A |
| Control 44 | Carbonyl value | 0.1 | 0.3 | 0.6 | 0.9 |
| | Acid value | 0.01 | 0.04 | 0.07 | 0.18 |
| | pH | 6.4 | 6.3 | 6.0 | 5.5 |
| | Odor | A | A | B | C |
| Control 45 | Carbonyl value | 0.1 | 0.2 | 0.4 | 0.8 |
| | Acid value | 0.01 | 0.03 | 0.09 | 0.18 |
| | pH | 6.5 | 6.3 | 6.0 | 5.5 |
| | Odor | A | A | B | C |

EXAMPLE 31

In a stainless steel reactor having an inner volume of 1,000 ml and provided with a thermometer, a pressure gauge, and a stirrer, 200 g of nonylphenol (molecular weight 221), 0.6 g of potassium hydroxide as a catalyst, and 400 g of ethylene oxide were heated at 150° C. under pressure of 6.0 kg/cm$^2$G for reaction. The resultant averagely 10-mole ethylene oxide adduct of nonylphenol and 7 g of Kyowado 600 PUPS (synthetic adsorbent produced by Kyowa Chemical Industry Co., Ltd.) added thereto were stirred at 80° C. for 30 minutes. The resultant mixture was transferred into a filter precoated with diatomaceous earth and treated therein for removal of Kyowado 600 BUPS which had adsorbed the catalyst. The averagely 10-mole ethylene oxide of nonylphenol separated by the filtration and 2.3 g of an aqueous 50 wt% sodium lactate solution added thereto were toroughly stirred. The averagely 10-mole ethylene oxide adduct of nonylphenol obtained as the result was tested for the effect of aging. The results are shown in Table 31.

CONTROL 46

The procedure of Example 31 was repeated, except that the use of the aqueous sodium lactate solution was omitted. The results are shown in Table 31.

TABLE 31

| Example | Item of test | Change by aging (number of days passed) | | | |
|---|---|---|---|---|---|
| | | 0 | 7 | 14 | 35 |
| Example 31 | Carbonyl value | 0.1 | 0.1 | 0.2 | 0.2 |
| | Acid value | 0.01 | 0.01 | 0.02 | 0.03 |
| | pH | 6.5 | 6.5 | 6.5 | 6.5 |
| | Odor | A | A | A | A |
| Control 46 | Carbonyl value | 0.1 | 0.2 | 0.3 | 0.7 |
| | Acid value | 0.01 | 0.02 | 0.06 | 0.15 |
| | pH | 6.3 | 6.2 | 5.9 | 5.7 |
| | Odor | A | A | B | C |

EXAMPLE 32

One mole of averagely 3.0-mole ethylene oxide adduct of primary alcohol containing lactic acid obtained in Example 1 was charged into a 1 liter of vessel for stirring, maintained at a temperature of 30° to 35° C. and 1 mole of chlorosulfonic acid was dropped into the vessel for about 1 hour to react with under stirring vigorously. After finishing the charging of chlorosulfonic acid, nitrogen gas was charged into the vessel, by-produced hydrogen chloride was removed and then the reaction liquid was neutralized by pouring into an aqueous sodium hydroxide solution under maintaining a temperature of not more than 40° C. to obtain aqueous primary alcohol ethoxylate sulfate solution. The primary alcohol ethoxylate sulfate was tested for the effect of aging. The salts are shown in Table 32.

CONTROL 47

The procedure of Example 32 was repeated, except that 0.9 g of acetic acid was used in place of the aqueous lactic acid solution. The results are shown in Table 32.

EXAMPLE 33

The averagely 3.0-mole ethylene oxide adduct of primary alcohol obtained in Example 2 was subjected to sulfation by a similar method of Example 32. The results are shown in Table 32.

CONTROL 48

The procedure of Example 33 was repeated, except that 0.9 g of the aqueous 85 wt% phosphoric acid solution was used in place of the aqueous lactic acid solution. The results are shown in Table 32.

EXAMPLE 34

The averagely 3.0-mole ethylene oxide adduct of primary alcohol obtained Example 3 was subjected to sulfation by a similar method of Example 32. The results are shown in Table 32.

CONTROL 49

The procedure of Example 34 was repeated, except that 1.5 g of an aqueous 50 wt% sulfuric acid solution was used in place of the aqueous lactic acid solution. The results are shown in Table 32.

EXAMPLE 35

The averagely 3.0-mole ethylene oxide adduct of primary alcohol obtained in Example 4 was subjected to sulfation by a similar method of Example 32. The results are shown in Table 32.

CONTROL 50

The procedure of Example 35 was repeated, except that 1.1 g of acetic acid solution was used in place of the aqueous lactic acid solution. The results are shown in Table 32.

EXAMPLE 36

The averagely 0.9-mole ethylene oxide adduct of primary alcohol obtained Example 5 was subjected to sulfation by a similar method of Example 32. The results are shown in Table 32.

CONTROL 51

The procedure of Example 36 was repeated, except that 0.9 g of acetic acid was used in place of the aqueous lactic acid solution. The results are shown in Table 32.

EXAMPLE 37

The averagely 3.0-mole ethylene oxide adduct of primary alcohol obtained in Example 7 was subjected to sulfation by a similar method of Example 32. The results are shown in Table 32.

CONTROL 52

The procedure of Example 37 was repeated, except that lactic acid was omitted. The results are shown in Table 32.

TABLE 32

| Example | Item of test | Change by aging (number of days passed) | | |
|---|---|---|---|---|
| | | 0 | 7 | 14 |
| Example 32 | pH | 7.2 | 6.7 | 6.2 |
| | Odor | A | A | A |
| Control 47 | pH | 7.2 | 5.3 | 4.6 |
| | Odor | A | B | C |
| Example 33 | pH | 7.5 | 7.0 | 6.7 |
| | Odor | A | A | A |
| Control 48 | pH | 7.7 | 5.5 | 5.0 |
| | Odor | A | B | B |
| Example 34 | pH | 7.3 | 6.9 | 6.4 |
| | Odor | A | A | A |
| Control 49 | pH | 7.5 | 6.0 | 5.2 |
| | Odor | A | A | A |
| Example 35 | pH | 7.3 | 6.8 | 6.4 |
| | Odor | A | A | A |
| Control 50 | pH | 7.3 | 5.5 | 4.9 |
| | Odor | A | B | B |
| Example 36 | pH | 7.4 | 6.9 | 6.5 |
| | Odor | A | A | A |
| Control 51 | pH | 7.3 | 5.5 | 4.8 |
| | Odor | A | B | B |
| Example 37 | pH | 7.2 | 6.8 | 6.4 |
| | Odor | A | A | B |
| Control 52 | pH | 7.3 | 5.7 | 4.9 |
| | Odor | A | B | C |

EXAMPLE 38

One mole of averagely 7-mole ethylene oxide adduct of secondary alcohol containing lactic acid obtained in Example 8 was charged into a 1 liter of vessel for stirring, maintained at a temperature of 10° to 15° C. and 1 mole of chlorosulfonic acid was dropped into the vessel for about 1 hour to react with under stirring vigorously. After finishing the charging of chlorosulfonic acid, nitrogen gas was charged into the vessel, by-produced hydrogen chloride was removed and then the reaction liquid was neutralized by pouring into an aqueous sodium hydroxide solution under maintaining a temperature of not more than 40° C. to obtain aqueous secondary alcohol ethoxylate sulfate solution. The secondary alcohol ethoxylate sulfate was tested for the effect of aging. The salts are shown in Table 33.

CONTROL 53

The procedure of Example 38 was repeated, except that 0.9 g of acetic acid was used in place of the aqueous lactic acid solution. The results are shown in Table 32.

EXAMPLE 39

The averagely 9-mole ethylene oxide adduct of primary alcohol obtained in Example 9 was subjected to sulfation by a similar method of Example 38. The results are shown in Table 33.

CONTROL 54

The procedure of Example 39 was repeated, except that 0.9 g of an aqueous 85 wt% phosphoric acid solution was used in place of the aqueous lactic acid solution. The results are shown in Table 33.

EXAMPLE 40

The averagely 7-mole ethylene oxide adduct of secondary alcohol obtained Example 12 was subjected to sulfation by a similar method of Example 38. The results are shown in Table 33.

CONTROL 55

The procedure of Example 40 was repeated, except that 0.9 g of an aqueous 85 wt% phosphoric acid solution was used in place of the aqueous lactic acid solution. The results are shown in Table 33.

EXAMPLE 41

The averagely 7-mole ethylene oxide adduct of secondary alcohol obtained in Example 13 was subjected to sulfation by a similar method of Example 38. The results are shown in Table 33.

CONTROL 56

The procedure of Example 41 was repeated, except that lactic acid was omitted. The results are shown in Table 33.

TABLE 33

| Example | Item of test | Change by aging (number of days passed) | | |
|---|---|---|---|---|
| | | 0 | 7 | 14 |
| Example 38 | pH | 7.2 | 6.8 | 6.4 |
| | Odor | A | A | B |
| Control 53 | pH | 7.3 | 5.7 | 4.9 |
| | Odor | A | B | B |
| Example 39 | pH | 7.4 | 7.0 | 6.6 |
| | Odor | A | A | B |
| Control 54 | pH | 7.4 | 5.3 | 4.7 |
| | Odor | A | B | B |
| Example 40 | pH | 7.3 | 6.5 | 6.0 |
| | Odor | A | A | B |
| Control 55 | pH | 7.3 | 5.0 | 4.3 |
| | Odor | A | B | C |
| Example 41 | pH | 7.4 | 6.7 | 6.4 |
| | Odor | A | A | A |
| Control 56 | pH | 7.4 | 5.6 | 4.7 |
| | Odor | A | B | C |

EXAMPLE 42

One mole of averagely 10-mole ethylene oxide adduct of nonylphenol containing lactic acid obtained in Example 27 was charged into a 1 liter of vessel for stirring, maintained at a temperature of 30° to 35° C. and 1 mole of chlorosulfonic acid was dropped into the vessel for about 1 hour to react with under stirring vigorously. After finishing the charging of chlorosulfonic acid, nitrogen gas was charged into the vessel, by-produced hydrogen chloride was removed and then the reaction liquid was neutralized by pouring into an aqueous sodium hydroxide solution under maintaining a temperature of not more than 40° C. to obtain aqueous nonylphenol ethoxylate sulfate solution. The nonylphenol ethoxylate sulfate was tested for the effect of aging. The salts are shown in Table 34.

CONTROL 57

The procedure of Example 42 was repeated, except that 0.9 g of acetic acid was used in place of the aqueous lactic acid solution. The results are shown in Table 34.

CONTROL 58

The procedure of Example 42 was repeated, except that 0.9 g of an aqueous 85wt% phosphoric acid solution was used in the place of lactic acid solution. The results are shown in Table 34.

EXAMPLE 43

The averagely 3.0-mole ethylene oxide adduct of nonylphenol obtained in Example 28 was subjected to sulfation by a similar method of Example 42. The results are shown in Table 34.

CONTROL 59

The procedure of Example 43 was repeated, except that 0.9 g of acetic acid solution was used in place of the aqueous lactic acid solution. The results are shown in Table 34.

CONTROL 60

The procedure of Example 43 was repeated, except that 0.9 g of an aqueous 85 wt% phosphoric acid solution was used in place of the aqueous lactic acid solution. The results are shown in Table 34.

EXAMPLE 44

The averagely 10-mole ethylene oxide adduct of octylphenol obtained in Example 29 was subjected to sulfation by a similar method of Example 42. The results are shown in Table 34.

CONTROL 61

The procedure of Example 44 was repeated, except that 0.6 g of acetic acid solution was used in place of the aqueous lactic acid solution. The results are shown in Table 34.

CONTROL 62

The procedure of Example 44 was repeated, except that 0.65 g of an aqueous 85 wt% phosphoric acid solution was used in place of the aqueous lactic acid solution. The results are shown in Table 34.

TABLE 34

| Example | Item of test | Change by aging (number of days passed) | | |
|---|---|---|---|---|
| | | 0 | 7 | 14 |
| Example 42 | pH | 7.2 | 6.8 | 6.4 |
| | Odor | A | A | A |
| Control 57 | pH | 7.3 | 5.4 | 4.8 |
| | Odor | A | A | B |
| Control 58 | pH | 7.2 | 5.8 | 5.3 |
| | Odor | A | A | B |
| Example 43 | pH | 7.3 | 6.9 | 6.6 |
| | Odor | A | A | A |
| Control 59 | pH | 7.3 | 5.5 | 4.9 |
| | Odor | A | B | B |
| Control 60 | pH | 7.2 | 5.7 | 5.1 |
| | Odor | A | B | B |
| Example 44 | pH | 7.6 | 7.0 | 6.7 |
| | Odor | A | A | A |
| Control 61 | pH | 7.5 | 5.4 | 4.8 |
| | Odor | A | B | B |
| Control 62 | pH | 7.3 | 5.7 | 5.2 |
| | Odor | A | B | B |

The tests indicated in the following working examples were carried out as follows.

(1) Odor:

A 0.1-ml sample was admixed with 100 ml of odorless distilled water treated in advance with activated carbon, heated at 50° C., and compared in situ with the standard by the paired comparison method. The odor was rated by the five-point scale, wherein:
 5: Equal in odorlessness to standard.
 4: Slightly more odorous than standard.
 3: Relatively more odorous than standard.
 2: Clearly more odorous than standard.
 1: Extremely odorous as compared with standard.
 Standard:

(A) For the samples of Examples 50–55 and Controls 68–73, the detergent of Example 50 which had not yet undergone any change by aging was used as the standard.

(B) For the samples of Examples 58–61 and Controls 76–59, the detergent of Example 58 which had not yet undergone any change by aging was used as the standard.

(C) For the samples of Examples 63–66 and Controls 81–84, the detergent of Example 63 which had not yet undergone any change by aging was used as the standard.

(D) For the samples of Examples 68–73 and Controls 86–91, the detergent of Example 68 which had not yet undergone any change by aging was used as the standard.

(E) For the samples of Examples 74–80 and Controls 93–98, the detergent of Example 74 which had not yet undergone any change by aging was used as the standard.

(F) For the samples of Examples 81–83 and Controls 100–102, the detergent of Example 81 which had not yet undergone any change by aging was used as the standard.

(2) Test for detergent force:

Method A

In 1 liter of an aqueous solution of a liquid detergent sample diluted to a prescribed concentration, three artificially soiled broad cloths containing 65% of polyester and 35% of cotton and measuring 10×10 cm$^2$ were laundered with a Tago meter (revolution number: 100 rpm), under the following conditions.

Detergent concentration: 0.067 wt%
Water used for laundering: Tap water
Water temperature: 25° C.
Laundering time: 5 minutes
Rinsing: 5 minutes with tap water
Composition of defiling substance for artificial soiling
  A. Organic substance (by wt%)
    Myristic acid: 16.7
    Oleic acid: 16.7
    Tristearin: 16.7
    Triolein: 16.7
    Cholesterol: 8.8
    Cholesterol stearate: 2.2
    Paraffin wax (m.p. 50° to 52° C.): 11.1
    Squalene: 11.1
  B. Inorganic substance
    Clay (Kanto loam 250-mesh pass)
  C. Carbon
    Carbon black (250-mesh pass)

The defiling soil was prepared by mixing 49.75% by weight of the organic substance, 49.75% by weight of the inorganic substance, and 0.5% by weight of the carbon mentioned above. The refined white cloths were smeared with the soil to the extent of 45%±2% of reflectance.

(3) Calculation method for detergence of artificial soiled cloths

The detergent force of a sample was determined by measuring the reflectance at 530 mμ of original cloth before lanundring and of the soiled cloths before and after laundering with a reflectometer (made by Hiranuma Sangyo and marketed under desigantion of SPR-3 Mode) and subjecting the results of measurement to the following calculation.

$$\text{Detergence (\%)} = 100 \times \frac{\text{Reflectance after washing-reflectance before washing}}{\text{Reflectance of original cloth-reflectance before laundering}}$$

Method B

With an modified "Leenerts" detergent force tester containing a liquid detergent composition, six glass fabrics soiled to a prescribed extent were washed in accordance with JIS K-3370-4, 9.

(a) Washing conditions
Temperature of deterent solution: 0.15% by weight
Amount of defiling substance used: 0.163 gr/six fabrics
Glass plate: No. 2 of JIS R-3703
Water used: 3° DH water
Washing temperature: 30° C.
Agitation speed: 250 rpm
Washing time: 3 minutes
Rinsing time: 1 minute
Volume of liquid: 700 ml/pot (b) Preparation of soiled fabrics A defiling bath was prepared by dissolving 20 g of (1:1) mixture of beef tallow and soybean oil, 0.25 g of monoolefin, and 0.1 g of oil red in 60 ml of chloroform.

In the defiling bath kept at 25°±1° C., glass plates were immersed one by one to a depth of about 55 mm and held therein for 1 to 2 seconds to be soiled with the defiling substance and taken out of the bath thereafter.

In a constant temperature and humidity bath kept at 25°±1° C. and 60±5% of RH, the soiled glass plates were dried for 24 hrs, weighed, and immediately put to test for detergent force.

(c) Calculation of detergent force

The six glass plates were weighed before and after the defiling. After the washing, they were dried in the constant temperature and humidity bath for six hours and then weighed. The detergence (%) was calculated in accordance with the following formula.

$$\text{Detergence (\%)} = 100 \times \frac{\text{Weight after washing-weight before washing}}{\text{Weight after defiling-weight before defiling}}$$

EXAMPLE 45

By following the procedure of Example 1, a stabilized ethylene oxide adduct was obtained from an averagely 10-mole ethylene oxide adduct of primary alcohol (oxoalcohol) of 12 to 13 carbon atoms having an average molecular weight of 194 by addition of 2.8 g of an aqueous 50 wt% lactic acid solution thereto.

CONTROL 63

The procedure of Example 45 was repeated, except that the use of lactic acid was omitted, to afford an averagely 10-mole primary alcohol ethylene oxide adduct.

EXAMPLE 46

By following the procedure of Example 2, a stabilized ethylene oxide adduct was obtained from an averagely 10-mole ethylene oxide adduct of primary alcohol (Diadol) of 11 to 15 carbon atoms having an average molecular weight of 202 by addition of 2.8 g of an aqueous 50 wt% lactic acid solution thereto.

CONTROL 64

The procedure of Example 46 was repeated, except that the use of lactic acid was omitted, to afford an averagely 10-mole primary alcohol ethylene oxide adduct.

EXAMPLE 47

By following the procedure of Example 3, a stabilized ethylene oxide adduct was obtained from an averagely 10-mole ethylene oxide adduct of primary alcohol (Dobanol) of 12 to 13 carbon atoms having an average molecular weight of 194 by addition of 2.8 g of an aqueous 50 wt% lactic acid solution thereto.

CONTROL 65

The procedure of Example 47 was repeated, except that the use of lactic acid was omitted, to afford an averagely 10-mole primary alcohol ethylene oxide adduct.

EXAMPLE 48

By following the procedure of Example 6, a stabilized ethylene oxide adduct was obtained from an averagely 10-mole ethylene oxide adduct of coconut oil-reduced alcohol by addition of 2.8 g of an aqueous 50 wt% lactic acid solution thereto.

CONTROL 66

The procedure of Example 48 was repeated, except that the use of lactic acid was omitted, to afford an averagely 10-mole coconut oil reduced alcohol ethylene oxide adduct.

EXAMPLE 49

By following the procedure of Example 7, a stabilized ethylene oxide adduct was obtained from an averagely 10-mole ethylene oxide adduct of primary alcohol (Dovanol) of 12 to 13 carbon atoms having an average molecular weight of 194 by addition of 3.5 g of an aqueous 50 wt% sodium lactate solution thereto.

CONTROL 67

The procedure of Example 49 was repeated, except that the use of sodium lactate was omitted, to afford an averagely 10-mole primary alcohol ethylene oxide adduct.

EXAMPLE 50-55

Liquid detergent compositions were prepared by using as their main detergent active components the aliphatic primary alcohol ethoxylates of 6 to 30 carbon atoms containing lactic acid and/or lactates obtained in Examples 45-49. They were tested for odor and detergent force. The results are shown in Table 35.

CONTROLS 68-73

Liquid detergent compositions were prepared by using as their main detergent active components the aliphatic primary alcohol ethoxylates of 6 to 30 carbon atoms obtained in Controls 63-67. They were tested for odor and detergent force. The results are shown in Table 36.

TABLE 35

| | | Examples | | | | | | | | | | |
|---|---|---|---|---|---|---|---|---|---|---|---|---|
| | | 50 | | 51 | | 52 | | 53 | | 54 | | 55 |
| (Detergent composition, % by weight) | | | | | | | | | | | | |
| Adduct of Example 45 | | 30 | | | | | | | | | | |
| Adduct of Example 46 | | | | 30 | | | | | | | | |
| Adduct of Example 47 | | | | | | 5 | | | | | | |
| Adduct of Example 48 | | | | | | | | | | 5 | | |
| Adduct of Example 49 | | | | | | 30 | | | | | | 5 |
| LAS (sodium salt) *1 | | 7 | | 7 | | 7 | | 14 | | 14 | | 14 |
| AES (sodium salt) *2 | | 7 | | 7 | | 7 | | 4 | | 4 | | 4 |
| Triethanolamine | | 6 | | 6 | | 6 | | | | | | |
| Coconut oil fatty acid diethanolamide *3 | | | | | | | | 2 | | 2 | | 2 |
| Ethanol | | 5 | | 5 | | 5 | | 5 | | 5 | | 5 |
| Fluorescent whitening agent *4 | | 0.3 | | 0.3 | | 0.3 | | | | | | |
| Water | | Balance | | Balance | | Balance | | Balance | | Balance | | Balance |
| Total | | 100 | | 100 | | 100 | | 100 | | 100 | | 100 |
| (Results of evaluation) | | | | | | | | | | | | |
| Number of days of elapse | | 0 | 14 | 0 | 14 | 0 | 14 | 0 | 14 | 0 | 14 | 0 | 14 |
| (1) Test for odor | | 5 | 5 | 4 | 4 | 5 | 4 | 5 | 5 | 4 | 4 | 5 | 5 |
| (2) Test for detergent force (%) | Method A | 71 | 71 | 73 | 73 | 71 | 71 | | | | | | |
| | Method B | | | | | | | 75 | 75 | 74 | 74 | 75 | 75 |

*1 Produced by Teikoku Kako and marketed under designation of "SBN 12-65"
*2 Produced by Taiko Oils and Fats and marketed under designation of "Diadol 115H, 3EO sulfate"
*3 Produced by Kawaken Fine Chemical and marketed under designation of "Amizol CDE"
*4 Produced by Sumitomo Chemical and marketed under designation of "Whitex BK"

TABLE 36

| | Controls | | | | | |
|---|---|---|---|---|---|---|
| | 68 | 69 | 70 | 71 | 72 | 73 |
| (Detergent composition, % by weight) | | | | | | |
| Adduct of Control 63 | 30 | | | | | |
| Adduct of Control 64 | | 30 | | | | |
| Adduct of Control 65 | | | | 5 | | |
| Adduct of Control 66 | | | | | 5 | |
| Adduct of Control 67 | | | 30 | | | 5 |
| LAS (sodium salt) *1 | 7 | 7 | 7 | 14 | 14 | 14 |
| AES (sodium salt) *2 | 7 | 7 | 7 | 4 | 4 | 4 |
| Triethanolamine | 6 | 6 | 6 | | | |
| Coconut oil fatty acid diethanolamide *3 | | | | 2 | 2 | 2 |

TABLE 36-continued

| | | Controls | | | | | | | | | | |
|---|---|---|---|---|---|---|---|---|---|---|---|---|
| | | 68 | | 69 | | 70 | | 71 | | 72 | | 73 |
| Ethanol | | 5 | | 5 | | 5 | | 5 | | 5 | | 5 |
| Fluorescent whitening agent *4 | | 0.3 | | 0.3 | | 0.3 | | | | | | |
| Water | | Balance | | Balance | | Balance | | Balance | | Balance | | Balance |
| Total | | 100 | | 100 | | 100 | | 100 | | 100 | | 100 |
| (Results of evaluation) | | | | | | | | | | | | |
| Number of days of elapse | | 0 | 14 | 0 | 14 | 0 | 14 | 0 | 14 | 0 | 14 | 0 | 14 |
| (1) Test for odor | | 3 | 1 | 3 | 1 | 3 | 2 | 4 | 2 | 3 | 1 | 4 | 2 |
| (2) Test for detergent | Method A | 71 | 71 | 73 | 72 | 70 | 71 | | | | | | |
| force (%) | Method B | | | | | | | 75 | 75 | 73 | 74 | 75 | 75 |

*1 Produced by Teikoku Kako and marketed under designation of "SBN 12-65"
*2 Produced by Taiko Oils and Fats and marketed under designation of "Diadol 115H, 3EO sulfate"
*3 Produced by Kawaken Fine Chemical and marketed under designation of "Amizol CDE"
*4 Produced by Sumitomo Chemical and marketed under designation of "Whitex BK"

EXAMPLE 56

By following the procedure of Example 8, a stabilized ethylene oxide adduct was obtained from an averagely 9-mole ethylene oxide adduct of secondary alcohol of 12 to 14 carbon atoms by addition of 2.8 g of an aqueous 50 wt% lactic acid solution thereto.

CONTROL 74

The procedure of Example 56 was repeated, except that the use of lactic acid was omitted, to afford an averagely 9-mole secondary alcohol ethylene oxide adduct.

EXAMPLE 57

By following the procedure of Example 13, a stabilized ethylene oxide adduct was obtained from an averagely 9-mole ethylene oxide adduct of secondary alcohol of 12 to 14 carbon atoms by addition of 3.5 g of an aqueous 50 wt% sodium lactate solution thereto.

CONTROL 75

The procedure of Example 57 was repeated, except that the use of sodium lactate was omitted, to afford an averagely 9-mole secondary alcohol ethylene oxide adduct.

EXAMPLES 58-61

Liquid detergent compositions were prepared by using as their main detergent active components the secondary alcohol ethoxylates containing lactic acid and/or lactates obtained in Examples 56-57 and 11-12. They were tested for odor and detergent force. The results are shown in Table 37.

CONTROLS 76-79

Liquid detergent compositions were prepared by using as their main detergent active components the secondary alcohol ethoxylates obtained in Controls 74-75 and 11-12. They were tested for odor and detergent force. The results are shown in Table 37.

TABLE 37

| | | Examples | | | | Controls | | | |
|---|---|---|---|---|---|---|---|---|---|
| | | 58 | 59 | 60 | 61 | 76 | 77 | 78 | 79 |
| (Detergent composition, % by weight) | | | | | | | | | |
| Adduct of Example 56 | | 30 | | | | | | | |
| Adduct of Example 57 | | | 30 | | | | | | |
| Adduct of Example 11 | | | | 5 | | | | | |
| Adduct of Example 12 | | | | | 5 | | | | |
| Adduct of Control 74 | | | | | | 30 | | | |
| Adduct of Control 75 | | | | | | | 30 | | |
| Adduct of Control 11 | | | | | | | | 5 | |
| Adduct of Control 12 | | | | | | | | | 5 |
| LAS (sodium salt) *1 | | 7 | 7 | 14 | 14 | 7 | 7 | 14 | 14 |
| AES (sodium salt) *2 | | 7 | 7 | 4 | 4 | 7 | 7 | 4 | 2 |
| Coconut oil fatty acid diethanolamide *3 | | | | 2 | 2 | | | 2 | 2 |
| Ethanol | | 5 | 5 | 5 | 5 | 5 | 5 | 5 | 5 |
| Fluorescent whitening agent *4 | | 0.3 | 0.3 | | | 0.3 | 0.3 | | |
| Water | | Balance | Balance | Balance | Balance | Balance | Balance | Balance | Balance |
| Total | | 100 | 100 | 100 | 100 | 100 | 100 | 100 | 100 |
| (Results of evaluation) | | | | | | | | | |
| Number of days of elapse | | 0 14 | 0 14 | 0 14 | 0 14 | 0 14 | 0 14 | 0 14 | 0 14 |
| (1) Test for odor | | 5 5 | 5 4 | 5 5 | 5 4 | 4 2 | 4 2 | 4 2 | 4 2 |
| (2) Test for detergent | Method A | 70 70 | 70 70 | | | 70 70 | 70 70 | | |
| force (%) | Method B | | | 74 74 | 76 76 | | | 74 74 | 76 75 |

*1 Produced by Teikoku Kako and marketed under designation of "SBN 12-65"
*2 Produced by Taiko Oils and Fats and marketed under designation of "Diadol 115H, 3EO sulfate"
*3 Produced by Kawaken Fine Chemical and marketed under designation of "Amizol CDE"
*4 Produced by Sumitomo Chemical and marketed under designation of "Whitex BK"

EXAMPLE 62

By following the procedure of Example 27, a stabilized ethylene oxide adduct was obtained from an averagely 16-mole ethylene oxide adduct of nonylphenol using potassium hydroxide as catalyst and 1.9 g of an aqueous 50 wt% lactic acid solution.

CONTROL 80

The procedure of Example 62 was repeated, except that 1.0 g of an aqueous 50 wt% sulfuric acid solution was used in the place of the aqueous lactic acid solution.

EXAMPLES 63 TO 66

Liquid detergent compositions were prepared by using as their main detergent active components the alkylphenols ethoxylates containing lactic acid obtained in Examples 27, 29, 31 and 62. They were tested for odor and detergent force. The results are shown in Table 38.

CONTROL 81 TO 84

Liquid detergent compositions were prepared by using as their main detergent active components the alkylphenols ethoxylates obtained in Controls 38, 43, 46 and 80. The results are shown in Table 38.

9.0-mole ethylene oxide adduct of palm oil hydrogenated primary alcohol containing 2.8 g of an aqueous 50 wt% lactic acid solution.

CONTROL 85

The procedure of Example 67 was repeated, except that 0.9 g of acetic acid was used in the place of aqueous lactic acid solution.

EXAMPLES 68 TO 71

Liquid detergent compositions were prepared by using as their main detergent active components the primary alcohol ethoxysulfate in Examples 32 to 37 and 67. They were tested for odor and detergent force. The results are shown in Table 39.

CONTROLS 86 TO 91

Liquid detergent compositions were prepared by using as their main detergent active components the primary alcohol ethoxysulfate in Controls 47 to 52 and 85. They were tested for odor and detergent force. The results are shown in Table 40.

TABLE 38

|  | Examples |  |  |  |  |  |  |  | Controls |  |  |  |  |  |  |  |
|---|---|---|---|---|---|---|---|---|---|---|---|---|---|---|---|---|
|  | 63 |  | 64 |  | 65 |  | 66 |  | 81 |  | 82 |  | 83 |  | 84 |  |
| (Detergent composition, % by weight) | | | | | | | | | | | | | | | | |
| Adduct of Example 27 | 25 | | | | | | | | | | | | | | | |
| Adduct of Example 62 | | | 20 | | | | | | | | | | | | | |
| Adduct of Example 29 | | | | | 20 | | | | | | | | | | | |
| Adduct of Example 31 | | | | | | | 25 | | | | | | | | | |
| Adduct of Control 38 | | | | | | | | | 25 | | | | | | | |
| Adduct of Control 80 | | | | | | | | | | | 20 | | | | | |
| Adduct of Control 43 | | | | | | | | | | | | | 20 | | | |
| Adduct of Control 46 | | | | | | | | | | | | | | | 25 | |
| LAS (sodium salt) *1 | 7 | | 10 | | 10 | | 7 | | 7 | | 10 | | 10 | | 7 | |
| AES (sodium salt) *2 | 7 | | 9 | | 9 | | 7 | | 7 | | 9 | | 9 | | 7 | |
| Coconut oil fatty acid diethanolamide *3 | 2 | | 2 | | 2 | | 2 | | 2 | | 2 | | 2 | | 2 | |
| Monoethylene glycol | 5 | | 5 | | 5 | | 5 | | 5 | | 5 | | 5 | | 5 | |
| Nitrylotri acetic acid (sodium salt) | 0.5 | | 0.5 | | 0.5 | | 0.5 | | 0.5 | | 0.5 | | 0.5 | | 0.5 | |
| Water | Balance | | Balance | | Balance | | Balance | | Balance | | Balance | | Balance | | Balance | |
| Total | 100 | | 100 | | 100 | | 100 | | 100 | | 100 | | 100 | | 100 | |
| (Results of evaluation) | | | | | | | | | | | | | | | | |
| Number of days of elapse | 0 | 14 | 0 | 14 | 0 | 14 | 0 | 14 | 0 | 14 | 0 | 14 | 0 | 14 | 0 | 14 |
| (1) Test for odor | 5 | 5 | 5 | 5 | 5 | 4 | 5 | 4 | 4 | 2 | 4 | 2 | 5 | 2 | 4 | 3 |
| (2) Test for detergent force (%) Method A | 73 | 73 | 71 | 72 | 71 | 70 | 73 | 73 | 73 | 73 | 72 | 72 | 70 | 70 | 72 | 73 |

*1 Produced by Teikoku Kako and marketed under designation of "SBN 12-65"
*2 Produced by Taiko Oils and Fats and marketed under designation of "Diadol 115H, 3EO sulfate"
*3 Produced by Kawaken Fine Chemical and marketed under designation of "Amizol CDE"

EXAMPLE 67

By following the procedure of Example 32, a primary alcohol ethoxysulfate was obtained from averagely

TABLE 39

|  | Examples |  |  |  |  |  |
|---|---|---|---|---|---|---|
|  | 68 | 69 | 70 | 71 | 72 | 73 |
| (Detergent composition, % by weight) | | | | | | |
| Adduct of Example 32 | 12 | | | | | |
| Adduct of Example 34 | | 12 | | | | |
| Adduct of Example 35 | | | 12 | | | |
| Adduct of Example 36 | | | | | 5 | |
| Adduct of Example 67 | | | | | | 5 |
| Adduct of Example 37 | | | | 12 | | |
| LAS (sodium salt) *1 | 7 | 7 | 7 | 7 | 13 | 13 |
| AE *2 | 25 | 25 | 25 | 25 | | |
| AE *3 | | | | | 5 | 5 |
| Triethanolamine | 6 | 6 | 6 | | | |
| Coconut oil fatty acid diethanolamide *4 | | | | | 2 | 2 |
| Ethanol | 5 | 5 | 5 | 5 | 5 | 5 |
| Fluorescent whitening agent *5 | 0.3 | 0.3 | 0.3 | 0.3 | | |
| Water | Balance | Balance | Balance | Balance | Balance | Balance |
| Total | 100 | 100 | 100 | 100 | 100 | 100 |
| (Results of evaluation) | | | | | | |
| Number of days of elapse | 0  14 | 0  14 | 0  14 | 0  14 | 0  14 | 0  14 |
| (1) Test for odor | 5   5 | 5   5 | 5   4 | 5   5 | 5   5 | 5   5 |

TABLE 39-continued

| | | Examples | | | | | | | | | | |
|---|---|---|---|---|---|---|---|---|---|---|---|---|
| | | 68 | | 69 | | 70 | | 71 | | 72 | 73 | |
| (2) Test for detergent force (%) | Method A | 73 | 73 | 72 | 73 | 72 | 72 | 73 | 73 | | | |
| | Method B | | | | | | | | | 74 | 73 | 73 | 73 |

*1 Produced by Teikoku Kako and marketed under designation of "SBN 12-65"
*2 Produced by Nippon Shokubai Kagaku Kogyo Co., Ltd. and marketed under designation of "Softanol 70H"
*3 Produced by Nippon Shokubai Kagaku Kogyo Co., Ltd. and marketed under designation of "Softanol 90H"
*4 Produced by Kawaken Fine Chemical and marketed under designation of "Amizol CDE"
*5 Produced by Sumitomo Chemical and marketed under designation of "Whitex BK"

TABLE 40

| | | Controls | | | | | | | | | | |
|---|---|---|---|---|---|---|---|---|---|---|---|---|
| | | 86 | | 87 | | 88 | | 89 | | 90 | | 91 |
| (Detergent composition, % by weight) | | | | | | | | | | | | |
| Adduct of Control 47 | | 12 | | | | | | | | | | |
| Adduct of Control 49 | | | | 12 | | | | | | | | |
| Adduct of Control 50 | | | | | | 12 | | | | | | |
| Adduct of Control 51 | | | | | | | | | | 5 | | |
| Adduct of Control 85 | | | | | | | | | | | | 5 |
| Adduct of Control 52 | | | | | | | | 12 | | | | |
| LAS (sodium salt) *1 | | 7 | | 7 | | 7 | | 7 | | 13 | | 13 |
| AE *2 | | 25 | | 25 | | 25 | | 25 | | | | |
| AE *3 | | | | | | | | | | 5 | | 5 |
| Triethanolamine | | 6 | | 6 | | 6 | | | | | | |
| Coconut oil fatty acid diethanolamide *4 | | | | | | | | | | 2 | | 2 |
| Ethanol | | 5 | | 5 | | 5 | | 5 | | 5 | | 5 |
| Fluorescent whitening agent *5 | | 0.3 | | 0.3 | | 0.3 | | 0.3 | | | | |
| Water | | Balance | | Balance | | Balance | | Balance | | Balance | | Balance |
| Total | | 100 | | 100 | | 100 | | 100 | | 100 | | 100 |
| (Results of evaluation) | | | | | | | | | | | | |
| Number of days of elapse | | 0 | 14 | 0 | 14 | 0 | 14 | 0 | 14 | 0 | 14 | 0 | 14 |
| (1) Test for odor | | 4 | 2 | 4 | 2 | 4 | 2 | 4 | 3 | 4 | 2 | 4 | 2 |
| (2) Test for detergent force (%) | Method A | 72 | 72 | 73 | 73 | 72 | 73 | 73 | 73 | | | | |
| | Method B | | | | | | | | | 73 | 74 | 74 | 73 |

*1 Produced by Teikoku Kako and marketed under designation of "SBN 12-65"
*2 Produced by Nippon Shokubai Kagaku Kogyo Co., Ltd. and marketed under designation of "Softanol 70H"
*3 Produced by Nippon Shokubai Kagaku Kogyo Co., Ltd. and marketed under designation of "Softanol 90H"
*4 Produced by Kawaken Fine Chemical and marketed under designation of "Amizol CDE"
*5 Produced by Sumitomo Chemical and marketed under designation of "Whitex BK"

EXAMPLE 74

The averagely 7-mole ethylene oxide adduct of secondary alcohol obtained in Example 10 was subjected to sulfation by a similar method of Example 38.

CONTROL 92

The procedure of Example 74 was repeated, except that 1.1 g of acetic acid was used in the place of aqueous lactic acid solution.

EXAMPLES 75 TO 82

Liquid detergent compositions were prepared by using as their main detergent active components the secondary alcohol ethoxysulfate in Examples 38 to 41 and 74. They were tested for odor and detergent force. The results are shown in Table 41.

CONTROL 93 TO 98

Liquid detergent compositions were prepared by using as their main detergent active components the secondary alcohol ethoxysulfate in Controls 53 to 56 and 92. They were tested for odor and detergent force. The results are shown in Table 42.

TABLE 41

| | Examples | | | | | |
|---|---|---|---|---|---|---|
| | 75 | 76 | 77 | 80 | 81 | 82 |
| (Detergent composition, % by weight) | | | | | | |
| Adduct of Example 38 | 12 | | | | | |
| Adduct of Example 39 | | | | 5 | | |
| Adduct of Example 74 | | 12 | | | | |
| Adduct of Example 40 | | | | | 5 | |
| Adduct of Example 41 | | | 12 | | | 5 |
| LAS (sodium salt) *1 | 7 | 7 | 7 | 13 | 13 | 13 |
| AE *2 | 25 | 25 | 25 | | | |
| AE *3 | | | | 5 | 5 | 5 |
| Triethanolamine | 6 | 6 | 6 | | | |
| Coconut oil fatty acid diethanolamide *4 | | | | 2 | 2 | 2 |
| Ethanol | 5 | 5 | 5 | 5 | 5 | 5 |
| Fluorescent whitening agent *5 | 0.3 | 0.3 | 0.3 | | | |
| Water | Balance | Balance | Balance | Balance | Balance | Balance |
| Total | 100 | 100 | 100 | 100 | 100 | 100 |
| (Results of evaluation) | | | | | | |

TABLE 41-continued

|  |  | Examples | | | | | | | | | | | |
| --- | --- | --- | --- | --- | --- | --- | --- | --- | --- | --- | --- | --- | --- |
|  |  | 75 | | 76 | | 77 | | 80 | | 81 | | 82 | |
| Number of days of elapse | | 0 | 14 | 0 | 14 | 0 | 14 | 0 | 14 | 0 | 14 | 0 | 14 |
| (1) Test for odor | | 5 | 5 | 5 | 5 | 5 | 4 | 5 | 5 | 5 | 4 | 5 | 5 |
| (2) Test for detergent | Method A | 71 | 71 | 70 | 71 | 71 | 70 | | | | | | |
| force (%) | Method B | | | | | | | 75 | 75 | 74 | 75 | 75 | 75 |

*1 Produced by Teikoku Kako and marketed under designation of "SBN 12-65"
*2 Produced by Nippon Shokubai Kagaku Kogyo Co., Ltd. and marketed under designation of "Softanol 70H"
*3 Produced by Nippon Shokubai Kagaku Kogyo Co., Ltd. and marketed under designation of "Softanol 90H"
*4 Produced by Kawaken Fine Chemical and marketed under designation of "Amizol CDE"
*5 Produced by Sumitomo Chemical and marketed under designation of "Whitex BK"

TABLE 42

|  | Controls | | | | | | | | | | | |
| --- | --- | --- | --- | --- | --- | --- | --- | --- | --- | --- | --- | --- |
|  | 93 | | 94 | | 95 | | 96 | | 97 | | 98 | |
| (Detergent composition, % by weight) | | | | | | | | | | | | |
| Adduct of Control 53 | 12 | | | | | | | | | | | |
| Adduct of Control 54 | | | | | | | 5 | | | | | |
| Adduct of Control 92 | | | 12 | | | | | | | | | |
| Adduct of Control 55 | | | | | | | | | 5 | | | |
| Adduct of Control 56 | | | | | 12 | | | | | | 5 | |
| LAS (sodium salt) *1 | 7 | | 7 | | 7 | | 13 | | 13 | | 13 | |
| AE *2 | 25 | | 25 | | 25 | | | | | | | |
| AE *3 | | | | | | | 5 | | 5 | | 5 | |
| Triethanolamine | 6 | | 6 | | 6 | | | | | | | |
| Coconut oil fatty acid diethanolamide *4 | | | | | | | 2 | | 2 | | 2 | |
| Ethanol | 5 | | 5 | | 5 | | 5 | | 5 | | 5 | |
| Fluorescent whitening agent *5 | 0.3 | | 0.3 | | 0.3 | | | | | | | |
| Water | Balance | | Balance | | Balance | | Balance | | Balance | | Balance | |
| Total | 100 | | 100 | | 100 | | 100 | | 100 | | 100 | |
| (Results of evaluation) | | | | | | | | | | | | |
| Number of days of elapse | 0 | 14 | 0 | 14 | 0 | 14 | 0 | 14 | 0 | 14 | 0 | 14 |
| (1) Test for odor | 4 | 2 | 4 | 2 | 4 | 3 | 4 | 2 | 4 | 2 | 4 | 3 |
| (2) Test for detergent  Method A | 71 | 71 | 71 | 71 | 71 | 70 | | | | | | |
| force (%)  Method B | | | | | | | 75 | 74 | 74 | 74 | 75 | 75 |

*1 Produced by Teikoku Kako and marketed under designation of "SBN 12-65"
*2 Produced by Nippon Shokubai Kagaku Kogyo Co., Ltd. and marketed under designation of "Softanol 70H"
*3 Produced by Nippon Shokubai Kagaku Kogyo Co., Ltd. and marketed under designation of "Softanol 90H"
*4 Produced by Kawaken Fine Chemical and marketed under designation of "Amizol CDE"
*5 Produced by Sumitomo Chemical and marketed under designation of "Whitex BK"

EXAMPLES 83 TO 85

Liquid detergent compositions were prepared by using as their main detergent active components nonylphenol ethoxysulfate in Examples 42 to 44. They were tested for odor and detergent force. The results are shown in Table 43.

CONTROLS 99 TO 102

Liquid detergent compositions were prepared by using as their main detergent active components nonylphenol ethoxysulfate in Controls 57 to 61. They were tested for odor and detergent force. The results are shown in Table 43.

TABLE 43

|  | Examples | | | | | | Controls | | | | | |
| --- | --- | --- | --- | --- | --- | --- | --- | --- | --- | --- | --- | --- |
|  | 83 | | 84 | | 85 | | 99 | | 100 | | 101 | |
| (Detergent composition, % by weight) | | | | | | | | | | | | |
| Sulfate of Example 42 | 12 | | | | | | | | | | | |
| Sulfate of Example 43 | | | 12 | | | | | | | | | |
| Sulfate of Example 44 | | | | | 12 | | | | | | | |
| Sulfate of Control 57 | | | | | | | 12 | | | | | |
| Sulfate of Control 60 | | | | | | | | | 12 | | | |
| Sulfate of Control 61 | | | | | | | | | | | 12 | |
| LAS (sodium salt) *1 | 7 | | 7 | | 7 | | 7 | | 7 | | 7 | |
| AE *2 | 20 | | 20 | | 20 | | 20 | | 20 | | 20 | |
| Coconut oil fatty acid diethanolamide *3 | | | | | | | 2 | | 2 | | | |
| Monoethylene glycol | 5 | | 5 | | 5 | | 5 | | 5 | | 5 | |
| Nitrylotri acetic acid (sodium salt) | 0.5 | | 0.5 | | 0.5 | | 0.5 | | 0.5 | | 0.5 | |
| Water | Balance | | Balance | | Balance | | Balance | | Balance | | Balance | |
| Total | 100 | | 100 | | 100 | | 100 | | 100 | | 100 | |
| (Results of evaluation) | | | | | | | | | | | | |
| Number of days of elapse | 0 | 14 | 0 | 14 | 0 | 14 | 0 | 14 | 0 | 14 | 0 | 14 |
| (1) Test for odor | 5 | 5 | 5 | 4 | 5 | 5 | 4 | 2 | 4 | 2 | 4 | 2 |
| (2) Test for detergent  Method A | 70 | 70 | 70 | 70 | 68 | 68 | 70 | 70 | 70 | 70 | 69 | 68 |

TABLE 43-continued

| | Examples | | | Controls | | |
|---|---|---|---|---|---|---|
| | 83 | 84 | 85 | 99 | 100 | 101 |
| force (%) | | | | | | |

*1 Produced by Teikoku Kako and marketed under designation of "SBN 12-65"
*2 Produced by Nippon Shokubai Kagaku Kogyo Co., Ltd. and marketed under designation of "Softanol 70H"
*3 Produced by Kawaken Fine Chemical and marketed under designation of "Amizol CDE"

What is claimed is:

1. A stabilized composition consisting of an adduct of an alkylene oxide moiety and an organic compound selected from the group consisting of phenols selected from the group consisting of mono and polyhydric substituted and unsubstituted phenols including bisphenols wherein the substituents are alkyl, alkylene, amino and halo and saturated and unsaturated mono and polyhydric alcohols and the sulfates of all of the foregoing, and a stabilizer selected from the group consisting of alkali metal salts of lactic acid, wherein the weight ratio of stabilizer to said organic compound is in the range of 0.001 to 5 parts per 100 parts and the pH of the composition is between 4 and 9.

2. A composition of claim 1 wherein the alkylene oxide moiety is at least one member of the group consisting of ethylene oxide or alkylene oxide of 3 or 4 carbon atoms.

3. A composition according to claim 1 wherein said salt is sodium lactate.

4. A composition according to claim 1 wherein the amount of said alkali metal salt of lactic acid is in the range of 0.05 to 1 part by weight based on 100 parts by weight of said organic compound.

5. A liquid detergent composition having as a detergent-active composition thereof a detergent-effective amount of a composition of claim 1.

6. A composition according to claim 5 wherein said salt is sodium lactate.

7. A composition according to claim 10 wherein said salt is sodium lactate.

8. A composition of claim 1 wherein the alcohols have from 6 to 30 carbon atoms.

9. A composition of claim 8 wherein the alkylene oxide moiety is at least one member of the group consisting of ethylene oxide or alkylene oxide of 3 or 4 carbon atoms.

10. A liquid detergent composition having as a detergent-active composition thereof a detergent-effective amount of a composition of claim 9.

11. A composition according to claim 9 wherein said alkylene oxide adduct is an aliphatic primary alcohol ethoxylate of 6 to 30 carbon atoms in alkyl moiety.

12. A composition according to claim 11 wherein the aliphatic moiety of said primary alcohol ethoxylate is saturated.

13. A composition according to claim 11 wherein the average number of moles of ethylene oxide in the adduct is in the range of 0.1 to 100 per mole of organic compound.

14. A composition according to claim 9 wherein said adduct is a secondary alcohol ethoxylate.

15. A composition according to claim 14 wherein said secondary alcohol ethoxylate is an adduct resulting from the addition reaction of ethylene oxide to a random secondary alcohol obtained by subjecting a N-paraffin of 8 to 20 carbon atoms to liquid-phase oxidation with molecular oxygen in the presence of a boron compound.

16. A composition according to claim 14 wherein the number of moles of ethylene oxide in the adduct falls in the range of 0.1 to 100 per mole of secondary alcohol.

17. A composition according to claim 8 wherein said hydroxyl group-containing organic compound is a phenol.

18. A composition according to claim 17 wherein said phenol is an alkyl phenol having an alkyl group of 8 to 9 carbon atoms.

19. A composition according to claim 17 wherein the average number of moles of alkylene oxide in adduct is in the range of 0.1 to 100 per mole of phenol.

20. A composition according to claim 9 wherein said alkylene oxide moiety contains at least two members of the group consisting of ethylene oxide and alkylene oxides of 3 to 4 carbon atoms and is added to an alcohol.

21. A composition according to claim 20 wherein said alcohol is a primary alcohol.

22. A composition according to claim 21 wherein said alcohol is a secondary alcohol.

23. A composition according to claim 21 wherein said alkylene oxide of 3 to 4 carbon atoms is propylene oxide.

24. A composition according to claim 21 wherein the total number of moles each of said ethylene oxide and alkylene oxide of 3 to 4 carbon atoms falls in the range of 0.1 to 100 per mole of alcohol.

25. A composition according to claim 9 wherein said adduct is an alkylene oxide adduct of a polyhydric alcohol.

26. A composition according to claim 25 wherein said polyhydric alcohol is an alkylene glycol of 2 to 3 carbon atoms.

27. A composition according to claim 25 wherein said polyhydric alcohol is polyethylene glycol.

28. A composition according to claim 25 wherein said polyhydric alcohol is a condensate of ethylene oxide and an hydrophobic substrate produced by the condensation of propylene oxide with propylene glycol.

29. A composition according to claim 25 wherein said polyhydric alcohol is a product made by reacting propylene oxide with ethylene diamine and then reacting that product with ethylene oxide.

30. A composition to claim 9 wherein said adduct is the sulfate of said phenols or alcohols.

31. A composition according to claim 30 wherein said adduct is an aliphatic primary alcohol ethoxy-sulfate of 6 to 30 carbon atoms in alkyl moiety.

32. A composition according to claim 30 wherein said adduct is a secondary alcohol ethoxysulfate.

33. A composition according to claim 30 wherein said alyene oxide moiety contains at least two members of the group consisting of ethylene oxide and alkylene oxides of 3 to 4 carbon atoms.

34. A composition according to claim 30 wherein said adduct is an alklyene oxide adduct sulfate of a phenol.

35. A liquid detergent composition having as a detergent-active composition thereof a detergent-effective amount of a composition of claim 30.

36. A composition according to claim 35 wherein said salt is sodium lactate.

* * * * *